US010648786B2

(12) United States Patent
Mann et al.

(10) Patent No.: US 10,648,786 B2
(45) Date of Patent: May 12, 2020

(54) MAGNETOELASTIC SENSOR FOR ANALYZING STRAIN

(71) Applicant: NANOHMICS, INC., Austin, TX (US)

(72) Inventors: Chris W Mann, Austin, TX (US);
Sebastian Liska, Austin, TX (US);
Joshua C Ruedin, Austin, TX (US)

(73) Assignee: NANOHMICS, INC., Austin, TX (US)

(*) Notice: Subject to any disclaimer, the term of this patent is extended or adjusted under 35 U.S.C. 154(b) by 27 days.

(21) Appl. No.: 16/116,864

(22) Filed: Aug. 29, 2018

(65) Prior Publication Data

US 2019/0072374 A1 Mar. 7, 2019

Related U.S. Application Data

(60) Provisional application No. 62/562,876, filed on Sep. 25, 2017, provisional application No. 62/553,786, filed on Sep. 1, 2017.

(51) Int. Cl.
*G01B 7/00* (2006.01)
*G01B 7/24* (2006.01)
(Continued)

(52) U.S. Cl.
CPC .......... *G01B 7/24* (2013.01); *G07F 7/00* (2013.01); *G07F 7/12* (2013.01)

(58) Field of Classification Search
CPC .... G01B 7/24; G07F 7/08; G07F 7/12; G01K 11/26; G01N 2291/02845; G01N 2291/0423; G01N 29/2412
(Continued)

(56) References Cited

U.S. PATENT DOCUMENTS 5,142,227 A 8/1992 Fish
5,444,244 A 8/1995 Kirk et al.
(Continued)

FOREIGN PATENT DOCUMENTS

EP 0523025 A1 1/1993
EP 1080340 B1 7/2003
(Continued)

OTHER PUBLICATIONS

Tortonese et al, "Atomic resolution with an atomic force microscope using piezoresistive detection", Appl Phys Lett, vol. 62(8): pp. 834-836, (Feb. 22, 1993).
(Continued)

*Primary Examiner* — Max H Noori
*Assistant Examiner* — Masoud H Noori
(74) *Attorney, Agent, or Firm* — George L Murphy; Murphy Strategic IP

(57) ABSTRACT

A magnetoelastic sensor is provided for analyzing strain induced by a force causing mechanical deformation of a region of a substrate. The sensor includes a substrate that has a non-deformable region and a mechanically deformable region, the mechanically deformable region coupled to the non-deformable region by a linking structure. The sensor also has a transformer having a magnetic flux guide. The flux guide includes a magnetoelastic section having a magnetoelastic subsection configured to be strainable by deformation of the mechanically deformable region. In transformer embodiments, one or more drive coil and/or pickup coil has a width greater than the minimal width of the linking structure. Sensor embodiments include numerous configurations. The sensor is useful in methods for analyzing strain and force.

34 Claims, 11 Drawing Sheets

(51) Int. Cl.
*G07F 7/00* (2006.01)
*G07F 7/12* (2006.01)

(58) Field of Classification Search
USPC .................................................. 73/779
See application file for complete search history.

(56) References Cited

U.S. PATENT DOCUMENTS

| | | | |
|---|---|---|---|
| 5,856,617 | A | 1/1999 | Gurney et al. |
| 6,003,374 | A | 12/1999 | Vigna et al. |
| 6,121,611 | A | 9/2000 | Lindsay et al. |
| 6,279,406 | B1 * | 8/2001 | Li .......................... G01R 33/02 73/861.08 |
| 6,433,543 | B1 * | 8/2002 | Shahinpoor ........ G01R 33/0327 324/244.1 |
| 6,611,140 | B1 | 8/2003 | Bloechl et al. |
| 6,668,627 | B2 | 12/2003 | Lange et al. |
| 6,688,162 | B2 | 2/2004 | Bachas et al. |
| 7,146,866 | B2 | 12/2006 | Morelli et al. |
| 7,583,081 | B2 | 9/2009 | Schmitt et al. |
| 7,913,569 | B2 | 3/2011 | Girshovich et al. |
| 8,222,898 | B1 | 7/2012 | Edelstein |
| 8,302,478 | B2 | 11/2012 | Gibbs |
| 8,484,760 | B2 | 7/2013 | Despont et al. |
| 2002/0166382 | A1 | 11/2002 | Bachas et al. |
| 2005/0074904 | A1 | 4/2005 | Chin et al. |
| 2008/0011058 | A1 | 1/2008 | Lal et al. |
| 2008/0024123 | A1 | 1/2008 | Grimm |
| 2009/0145239 | A1 | 6/2009 | Girshovich et al. |
| 2013/0276175 | A1 | 10/2013 | King et al. |
| 2015/0122044 | A1 * | 5/2015 | Gianchandani ....... H01L 41/125 73/779 |
| 2018/0164165 | A1 * | 6/2018 | Garshelis ................ H01L 41/12 |

FOREIGN PATENT DOCUMENTS

| | | |
|---|---|---|
| EP | 2090877 A2 | 8/2009 |
| EP | 2163907 A2 | 3/2010 |
| WO | 9960330 A1 | 11/1999 |

OTHER PUBLICATIONS

Ahn et al, "Micromachined Planar Inductors with Electroplated Nickel-Iron Permalloy Cores (spiral type, solenoid type, and toroidal-meander type)", Proc. 4th Symp. Magnetic Materials Processes and Devices, The Electrochemical Society Inc., Pennington, NJ. vol. 95-18: pp. 411-425, (1996).
Hathaway et al, "Magnetostrictive Materials", MRS Bulletin, Apr. 1993: pp. 34-41.
Amor et al, "A magnetoelastic microtransformer-based microstrain gauge", Sensors & Actuators A, vol. 129 (2006): pp. 41-44, (Dec. 20, 2005).
Rissing et al, "Inductive microtransformer exploiting the magnetoelastic effect", IEEE Transactions on Magnetics, vol. 34(4): pp. 1378-1380, (Jul. 1998).
Dinulovic et al, "Thin-Film Microtransformer for High Frequency Power Applications", EPJ Web of Conferences, vol. 75 (06006): pp. 1-4, (2014).
Lee, "Cantilever with integrated resonator for application of scanning probe microscope", Sensors and Actuators A, vol. 83(1-3): pp. 11-16 (Apr. 2000).
Kim et al, "Faraday's Induction Experiment in Nano-Transformers", IEEE Transactions on Nanotechnology, vol. 7(2): pp. 120-123, (Mar. 2008).
Penedo et al, "Magnetostriction-driven cantilevers for dynamic atomic force microscopy", Applied Physics Letters, vol. 95: pp. 143505-1-143505-3 (Oct. 9, 2009).
Dezuari et al, "A new hybrid technology for planar microtransformer fabrication", Sensors and Actuators A, vol. 71: pp. 198-207, 1998.
Huber et al, "Magnetoelastic resonance sensor for remote strain measurements", Appl Phys Lett, vol. 101: pp. 042402-1-042402-3, (Jul. 23, 2012).
Albrecht et al, "Frequency modulation detection using high-Q cantilevers for enhanced force microscope sensitivity", Journal of Applied Physics, vol. 69(2), pp. 668-673, (Jan. 1991).
Dapino et al, "A magnetoelastic model for villari-effect magnetostrictive sensors", Technical Report, Center for Research in Scientic Computation, Raleigh, NC, 2002.
Grimes et al, "Theory, Instrumentation and Applications of Magnetoelastic Resonance Sensors: A Review", Sensors, vol. 11: pp. 2809-2844, (Mar. 2, 2011).

* cited by examiner

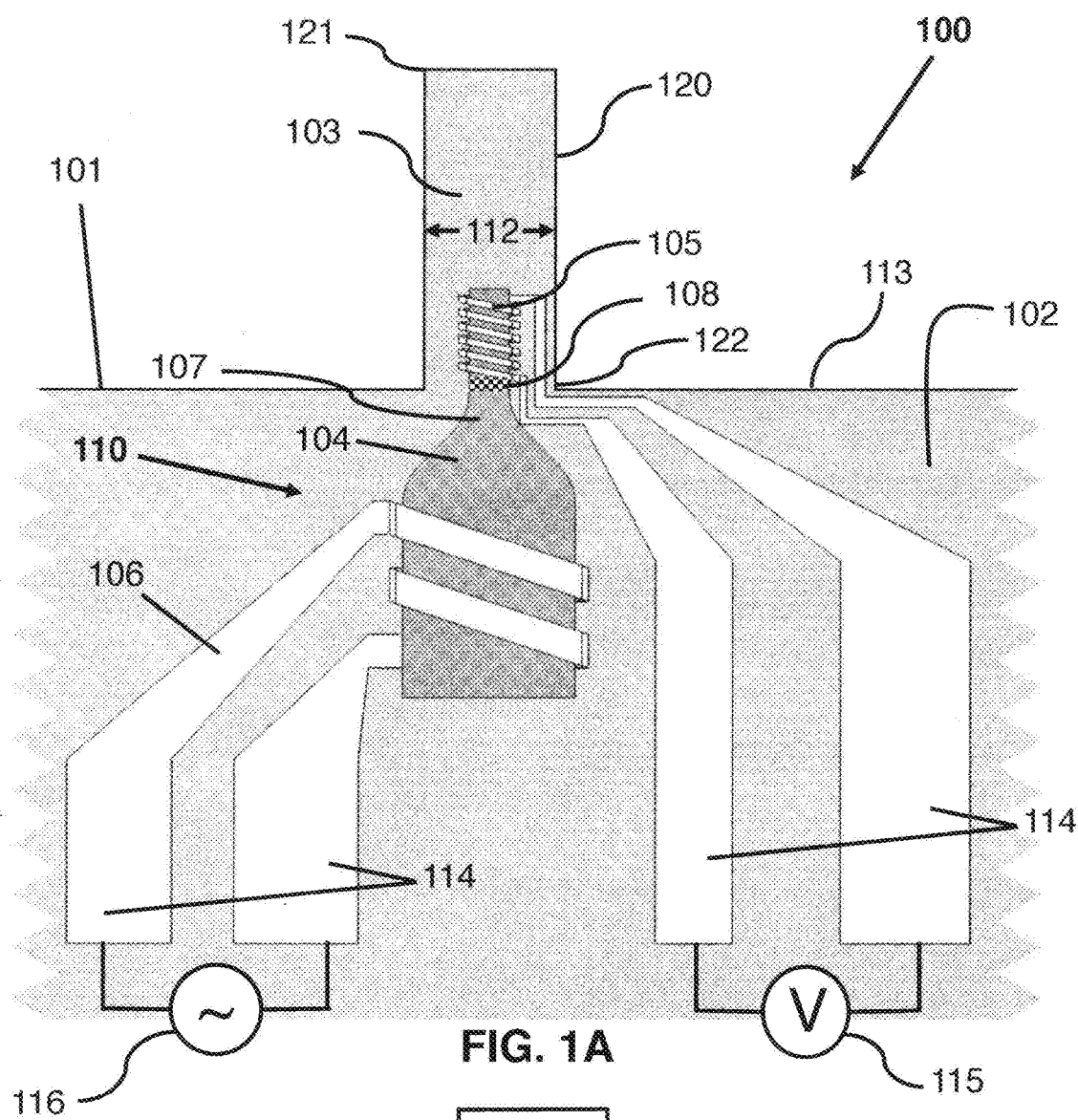
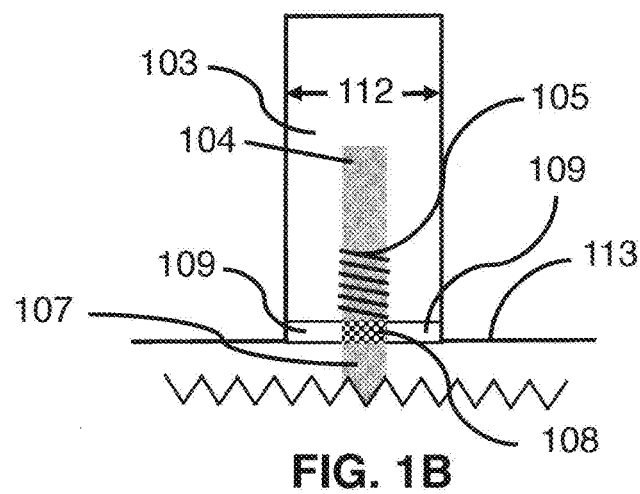
FIG. 1A
FIG. 1B

MAGNETOELASTIC SENSOR FOR ANALYZING STRAIN

This application claims priority to and the benefit of U.S. Provisional Application No. 62/553,786 filed Sep. 1, 2017 and U.S. Provisional Application No. 62/562,876 filed Sep. 25, 2017, each of which is incorporated by reference herein in its entirety.

STATEMENT REGARDING FEDERALLY SPONSORED RESEARCH

The invention was made, in part, with government support under Contract DE-SC0013120 awarded by the U.S. Department of Energy Office of Science. The government has certain rights in the invention.

FIELD OF THE INVENTION

The invention relates to a magnetoelastic sensor for use as a strain gauge and methods for use of the sensor for detecting and analyzing strain caused by deformation of a mechanically deformable region of a substrate. Embodiments of the sensor have transformer geometry and comprise a magnetic flux guide having a strainable magnetoelastic section on a substrate. Some applications of the sensor and methods include analyzing atomic scale forces that cause deflection of a cantilever.

GENERAL DESCRIPTION

Sensors for monitoring the deformation or deflection of a substrate, such as a cantilever, are used in atomic force microscopy (AFM), force amplified biological sensors (FABS), and other applications that require extreme sensitivity. Several such sensors have been described previously and utilize piezoelectric, capacitive, inductive, piezoresistive, piezovoltage, and optical lever methods, to name several, for measurement of cantilever deflection. The use of optical levers is the most common approach for monitoring very small deflections of cantilevers. Optical lever methods require optical access to the cantilever and optical alignment, which may be difficult or impossible in some situations. Inductive techniques typically have low sensitivity and also require large-area probes. Capacitive sensors require large-area probes and challenging alignment procedures to provide coupling necessary for detecting strain or deflection of a substrate. Alternative sensing methods have been evaluated to overcome these limitations. A piezoresistive strain gauge has been placed on a deformable structure for measuring strain on the deformable structure as it is acted on by a force (Tortonese et al., 1993, *Applied Physics Letters*, 62:834). Piezoresistive methods have limited sensitivity for detecting deformation-induced strain. Similar piezoelectric methods have limited sensitivity for detecting deformation-induced strain and are prone to drift, depolarization, and hysteresis. To date, experimental magnetoelastic material-based sensors are large and lack sensitivity for detecting atomic-scale forces, and significant miniaturization would be necessary for use with atomic force microscope cantilevers. Such direct miniaturization would likely result in excessive substrate heating during sensing and significant reductions in signal strength and signal-to-noise ratio and as such is not a practical solution.

Embodiments described herein are directed to a magnetoelastic sensor for analyzing strain and methods for making and using the sensor. Sensor embodiments comprise a substrate having non-deformable and mechanically deformable regions that are coupled by a linking structure. Sensor embodiments further comprise integrated inductors (drive coil and pickup coil) in transformer geometry. The transformer comprises a core of high magnetic susceptibility material that functions as a flux guide. Flux guides for use in sensor embodiments may be configured as an open magnetic circuit or as a closed magnetic circuit. The flux guide comprises a section of magnetoelastic or magnetostrictive material that comprises a subsection positioned at least partially on the mechanically deformable region of the substrate and configured to be strainable by deformation of the mechanically deformable region. The transformer also comprises a drive coil disposed and configured for inducing a time-varying electromagnetic field in the flux guide, such that at least a portion of the time-varying electromagnetic field passes through the strainable magnetoelastic subsection, and a pickup coil disposed and configured to receive at least a portion of the time-varying electromagnetic field that passes through the strainable magnetoelastic subsection. A force exerted on the mechanically deformable region of the substrate may induce strain on the strainable magnetoelastic subsection. Force-induced strain may result in changes to the magnetic properties of the magnetoelastic material, in particular a change to the magnetic susceptibility. Sensor embodiments use the inverse magnetostrictive effect, also known as the Villari effect, to detect the changes in magnetic properties of the material.

Magnetoelastic sensor embodiments incorporate novel architecture, wherein magnetoelastic material in the flux guide is operably positioned on a mechanically deformable region of a substrate, and wherein at least one drive coil or pickup coil has a width that is greater than the minimal width of a linking structure that links the mechanically deformable region of the substrate to a non-deformable region of the substrate. Increasing the size or width of one or more coil can enhance electromagnetic field coupling between the drive and pickup coils, thereby increasing sensor sensitivity and signal-to-noise ratio when detecting and analyzing strain and force. The novel architecture of sensor embodiments enables self-sensing sensors to be miniaturized to scales compatible with high-speed measurements of cantilevers and other substrate deflections and provides sensitivities and signal-to-noise ratios that are higher than are capable with previously described sensors.

In some embodiments, the linked deformable and non-deformable regions of the substrate may be coplanar. A sensor drive coil and one or more pickup coil may be positioned on the non-deformable region of a sensor substrate. In some aspects, a drive coil or a pickup coil is positioned on the deformable region of a substrate. In some aspects, a drive coil or pickup coil or both are positioned on the non-deformable region of a substrate. In some embodiments, a sensor can comprise an electrical current source electrically connected to the drive coil and a signal-receiving device electrically connected to the pickup coil. The signal-receiving device may further comprise a signal processor for use in analyzing strain.

In some embodiments, a sensor comprises a magnetic flux guide having a plurality of sections, which may comprise different magnetic materials. In some aspects, a sensor may have one or more of the drive coil and pickup coil wound around a region of the flux guide that comprises different sections.

In some embodiments, the mechanically deformable region is a region of a cantilever or a region of a microresonator. In some aspects, a microresonator is a region of a cantilever. In some embodiments, a sensor comprises a plurality of transformers, and in some aspects one or more transformers of the plurality may each be operably associated with a cantilever.

Some sensor embodiments can comprise a plurality of pickup coils. In some aspects, a sensor comprising a plurality of pickup coils may be used as a differencing sensor. Some embodiments provide methods for using differencing sensors for analyzing strain. In some embodiments, sensors can be configured to use spread spectrum methods.

Some embodiments comprise methods for using a sensor for analyzing strain and force. In some aspects, sensors and methods can be used in scanning probe technologies to identify and/or quantify atomic, electrical, magnetic, chemical, or structural aspects of materials. In some aspects, sensors and methods can be used to detect the presence of a substance, such as for example a molecule.

Other embodiments of the invention are discussed throughout this application. It is contemplated that any embodiment discussed herein can be implemented with respect to any method or composition of the invention, and vice versa. Compositions of the invention can be used to achieve methods of the invention.

It is specifically contemplated that embodiments of the magnetoelastic sensor described herein may comprise the elements described herein in various different combinations and numbers. Not all of the elements or types of elements in various sensor embodiments need be the same or have the same characteristics or parameters. Other objects, features and advantages of the invention will become apparent from the following detailed description. It should be understood, however, that the drawings, detailed description, and specific examples, while indicating specific embodiments and aspects of the invention, are given by way of illustration only, since various changes and modifications within the spirit and scope of the invention will become apparent to those skilled in the art from this detailed description.

Any section headings used herein are for organizational purposes only and are not to be construed as limiting the subject matter described. All documents, or portions of documents, cited in this application, including but not limited to patents, patent applications, articles, books, and treatises, are hereby expressly incorporated by reference in their entirety. To the extent documents, publications, patents, and patent applications incorporated by reference contradict the invention contained in the specification, the specification will supersede any contradictory material.

BRIEF DESCRIPTION OF THE FIGURES

The following drawings form part of the specification and are included to further demonstrate certain embodiments and aspects of the invention. The invention may be better understood by reference to one or more of these drawings in combination with the detailed description presented herein.

FIG. 1A is a schematic top view of one exemplary embodiment of a sensor.

FIG. 1B is an enlarged schematic top view of selected elements of a sensor embodiment.

DESCRIPTION OF CERTAIN EXEMPLARY EMBODIMENTS

Figure 2:
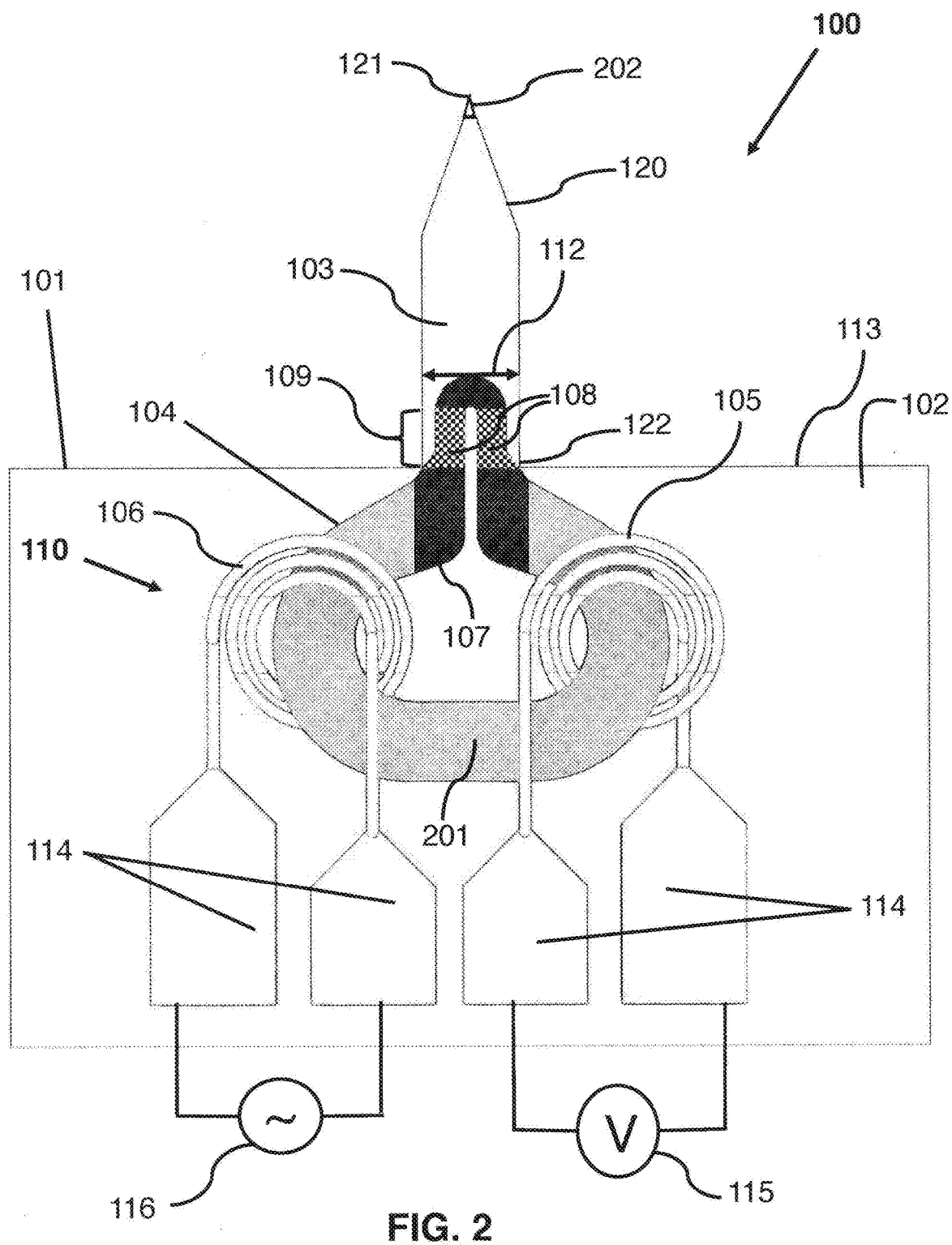
FIG. 2 is a schematic top view of a sensor embodiment having a composite flux guide configured as a closed magnetic circuit.

Reference will now be made in detail to certain exemplary embodiments, some of which are illustrated in the accompanying drawings. Certain terms used in the application are first defined. Additional definitions may be provided throughout the application. In general, the terms and phrases used herein have their art recognized meaning, which can be found in standard texts, manuscripts, and contexts known to those skilled in the art. Selected terms are defined to clarify their specific use in the context of the invention and/or to assist in understanding the invention.

The use of the word "a" or "an" when used in conjunction with the term "comprising" in the claims and/or the specification may mean "one," but it is also consistent with the meaning of "one or more," "at least one," and "one or more than one". As used herein, in the specification and claims, use of the term "at least one of x and y" means "x only", "y only", or "x and y". Similarly, "one or more than one of x and y" means "x only", "y only", or "x and y". "At least one of" and "one or more than one of" followed by a list of elements (e.g., one or more than one of a, b, c, and d), can refer to only one of the elements in the list, more than one of the elements in the list in any combination, or all of the elements in the list.

The use of the term "or" in the specification is used to mean "and/or" unless explicitly indicated to refer to alternatives only or the alternatives are mutually exclusive, although the disclosure supports a definition that refers to only alternatives and "and/or." It is also contemplated that anything listed using the term "or" may also be specifically excluded.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. The compositions and methods for their use may "comprise," "consist essentially of," or "consist of" any of the compositions or steps disclosed throughout the specification.

The terms "operably associated", "operably coupled", and "operably positioned" refer to an operable association between two or more components or elements. For example, components of electrical circuits, devices, and systems are operably associated. Operable association, operable coupling, and operable positioning do not necessarily require direct physical connection between specified components.

Disclosed herein are methods, compositions, and sensors for use in detecting and quantifying strain caused by deformation of a mechanically deformable element in response to a force applied to the element.

Sensor embodiments comprise a substrate having non-deformable and mechanically deformable regions coupled by a linking structure. Sensors further comprise integrated inductors (drive coil and pickup coil) in transformer geometry. In some embodiments, a transformer can be microscale (i.e., the transformer or one or more transformer component has one or more dimension from about 1 µm to about 1 mm) and may be referred to as a "microtransformer". The transformer comprises a core of material that functions as a flux guide. The flux guide comprises a section of magnetoelastic or magnetostrictive material having at least one subsection that is configured to be strainable by deformation of the mechanically deformable region. The transformer comprises a drive coil disposed and configured for inducing a time-varying electromagnetic field or "flux" in the flux guide, such that at least a portion of the time-varying electromagnetic field passes through the strainable magnetoelastic subsection, and a pickup coil disposed and configured for receiving at least a portion of the induced time-varying electromagnetic field that passes through the strainable magnetoelastic subsection. As such a drive coil and pickup coil of a transformer are operably associated. Sensor embodiments may have a configuration, wherein at least one of the drive coil and pickup coil has a width that is greater than the minimal width of the linking structure. In sensor embodiments, magnetoelastic material in the strainable subsection is operably positioned on the mechanically deformable region of the substrate. Exposure of the magnetoelastic material in the strainable subsection to mechanical strain can result in a change to a magnetic property of the magnetoelastic material, such as for example a change to the material's magnetic susceptibility. In some embodiments sensors are configured to detect and measure strain induced in the strainable magnetoelastic subsection by force-induced deformation of the mechanically deformable region of the substrate.

FIG. 1A is a schematic top view of one exemplary embodiment of a magnetoelastic sensor. In this embodiment, sensor 100 comprises magnetic flux guide 104 in an open magnetic circuit configuration. Substrate 101 comprises non-deformable region 102 and mechanically deformable region 103. In the embodiment shown here, mechanically deformable region 103 is a region of a cantilever 120. In this embodiment, cantilever 120 is a rectangular cantilever and has a free end 121 and a fixed end 122 that is adjoined to, is coplanar with, and abuts non-deformable region 102. In the exemplary aspect shown here, free end 121 is able to move independently of fixed end 122, for example when cantilever 120 bends or vibrates. In some aspects, a "region of a cantilever" may be an entire cantilever or may be less than an entire cantilever and be anywhere on a cantilever. In some aspects, mechanically deformable region 103 can encompass all of cantilever 120 from fixed end 122 to free end 121. In some aspects, mechanically deformable region 103 may be a smaller region of cantilever 120.

Magnetoelastic sensor 100 further comprises transformer 110, which comprises magnetic flux guide 104, first induction coil or drive coil 106, and second induction coil or pickup coil 105. In some embodiments, both drive coil 106 and pickup coil 105 are solenoid type coils. In sensor embodiments, drive coil 106 is disposed and configured to induce a time-varying electromagnetic field, at least part of which is confined in magnetic flux guide 104. In some aspects, at least a portion of the time-varying electromagnetic field passes through magnetoelastic section 107 and strainable subsection 108 of magnetoelastic section 107. Pickup coil 105 is disposed and configured to receive at least a portion of the time-varying electromagnetic field that passes through strainable magnetoelastic subsection 108. In sensor embodiments, magnetic flux guide 104 comprises magnetoelastic material, and in some embodiments magnetoelastic section 107 and strainable magnetoelastic subsection 108 are made of the same magnetoelastic material. In some aspects, such as that depicted in FIG. 1A, the entirety of magnetic flux guide 104 comprises magnetoelastic material and is made of the same magnetic material. In some aspects, the entirety of magnetic flux guide 104 comprises a single element of high magnetic susceptibility material, such as for example cobalt, which has a high magnetostrictive coefficient and Curie temperature. In some embodiments, the entirety of magnetic flux guide 104 may comprise an alloy of two or more high magnetic susceptibility materials having magnetoelastic properties. In some embodiments, as discussed further below, magnetic flux guide 104 may comprise a plurality of sections, with different sections comprising different magnetic materials. As used herein, a material having a high magnetic susceptibility is also referred to as a "high magnetic susceptibility material".

In sensor embodiments, strainable magnetoelastic subsection 108 is that part of magnetoelastic section 107, disposed between drive coil 106 and pickup coil 105 and configured to be strained by deformation of mechanically deformable region 103. In some embodiments, strainable magnetoelastic subsection 108 is positioned at least partially on an area of mechanically deformable region 103 that causes maximal strain on strainable magnetoelastic subsection 108 upon deformation of mechanically deformable region 103. In some embodiments, the area of mechanically deformable region 103 that causes maximal strain on strainable magnetoelastic subsection 108 may abut non-deformable region 102, in this example near cantilever fixed end 122.

In some aspects, strainable magnetoelastic subsection 108 may not be wholly positioned on an area of mechanically deformable region 103 that causes maximal deformation-induced strain of the strainable magnetoelastic subsection 108. In some aspects, such a position may not be desirable, such as for example only, when a different position is preferred or required for fabrication. In some aspects, at least a part of strainable magnetoelastic subsection 108 is positioned on at least a part of deformable region 103. In some sensor embodiments, strainable magnetoelastic subsection 108 may have a width that is less than the width of mechanically deformable region 103.

In sensor embodiments, non-deformable region 102 and mechanically deformable region 103 are linked by linking structure 109. An exemplary embodiment of linking structure 109 is depicted in FIG. 1B. FIG. 1B is an enlarged schematic top view of selected elements of one sensor embodiment. FIG. 1B depicts the positions of strainable subsection 108 and linking structure 109. (For ease of viewing, only selected elements of sensor 100 are shown in FIG. 1B.) In some aspects, for example that shown in FIGS. 1A and 1B, where non-deformable region 102 and mechanically deformable region 103 adjoin and abut one another, linking structure 109 is that part of mechanically deformable region 103 extending outward from edge 113 of non-deformable region 102 to the furthest extent of strainable subsection 108 on mechanically deformable region 103. The size and shape of strainable subsection 108 and linking structure 109 may vary among different sensor embodiments. In sensor embodiments, linking structure 109 has a minimal width 112 that is the shortest side to side extent of linking structure 109 and is measured parallel to the adjacent edge 113 of non-deformable region 102. In some embodiments, such as for example where cantilever 120 is rectangular (e.g., FIG. 1A), minimal width 112 of linking structure 109 may have the same or substantially the same width as does cantilever 120.

Magnetoelastic sensor 100 is further characterized in that at least one of drive coil 106 and pickup coil 105 have a width that is greater than the minimal width 112 of linking structure 109. In some embodiments, both drive coil 106 and pickup coil 105 may each have a width greater than minimal width 112. In sensor embodiments that comprise a plurality of pickup coils 105, one or more pickup coil may have a width greater than minimal width 112.

In some embodiments, drive coil 106 and pickup coil 105 are wires that wind around magnetic flux guide 104. The number of times that a wire (or coil) winds around the flux guide is the winding number, and the winding number is an integer. The winding number between any two points A and B on a coil, relative to a given flux guide, can be determined by tracing a path, P, along the coil from A to B, and performing a signed counting of the number of times the flux guide passes between point A and a point on path P. "Signed counting", as used here, means that if a line between A and a point on path P crosses the flux guide from left-to-right (what is left and right in relation to the sensors here), for example, the count is increased by one; and if a line between A and a point on path P crosses the flux guide from right-to-left, the count is decreased by one. In some embodiments, the orientation of flux guide 104 may also change, such as in a toroidal-meander configuration. In some embodiments, when the orientation of flux guide 104 changes, the signed counting can account for the flux guide orientation change by also changing the sign to match the orientation of the flux guide. More rigorously, it is necessary to keep track of the angle of the cross-product between the flux guide path vector and relative coil path vector, though this is often more readily identified by inspection (most designs will lend themselves to intuitive definitions). Each coil and flux guide will have a maximum winding number, which is the largest absolute value of the winding number that can be found for all points A, B in the wire for a given flux guide.

The footprint of a given coil, for a given flux guide, can be determined by generating the convex hull of the wire used as a coil that (1) bounds the segment of wire that includes the maximum winding number of the coil and (2) requires the minimum length of wire necessary. This footprint has a maximum dimension, which is the "width" of the coil.

In some embodiments, sensor 100 further comprises electrical contacts 114 for electrically connecting drive coil 106 to an electrical current source 116 and for electrically connecting pickup coil 105 to a signal receiving device 115 (such as for example a voltmeter as depicted in FIG. 1A) that can be configured to receive an electrical signal representative of the time-varying electromagnetic field received by pickup coil 105. In some aspects, analyzing a received electrical signal comprises detecting and/or measuring strain by evaluating characteristics of the received electrical signal and/or by comparing characteristics of the received electrical signal to characteristics of a reference electrical signal or to a selected reference value. In some embodiments, analyzing a received electrical signal may comprise implementing one or more algorithms using data corresponding to the electrical signal, a reference value, and/or a reference electrical signal. In some embodiments, one or more than one of electrical current source 116 and signal receiving device 115 can be positioned at a location that is off of substrate 101. In some embodiments of the invention, one or more than one of 116 and 115 may be at least partially positioned on non-deformable region 102.

During sensor 100 operation, in some embodiments, drive coil 106 is driven with an AC current generated by electrical current source 116, and drive coil 106 induces a time-varying electromagnetic field that is coupled into magnetic flux guide 104 which functions as a flux guide coupling drive coil 106 and pickup coil 105. In some aspects, the frequency of the time-varying magnetic field induced by drive coil 106 is from about 20 kHz to about 1 GHz inclusive. Just as in a standard electrical transformer, this coupling can induce an AC voltage in pickup coil 105. Exposure of deformable region 103 to a force of sufficient strength may induce strain on strainable magnetoelastic subsection 108, thereby causing a change in the magnetic susceptibility of the magnetoelastic material therein. This phenomenon is known as the Villari Effect or inverse magnetostriction. Strain-induced change in the magnetic susceptibility of strainable magnetoelastic subsection 108 can alter coupling of the drive and pickup coils and mutual inductance of transformer 110. The resulting change in the induced voltage on pickup coil 105 can be proportional to the deformation-induced strain.

Sensor 100 may be used to detect and analyze a force or forces acting on mechanically deformable region 103. In some embodiments, a "force" refers to an interaction that, if of sufficient strength, can cause deformation of mechanically deformable region 103. In these embodiments induced strain on strainable magnetoelastic subsection 108 may be measurable and not equal to zero. In some embodiments, the analyzed or measured strain may be equal to zero because deformable region 103 is exposed to a force that is equal to zero. In some embodiments, a force may not be zero and still may not be of sufficient strength to cause deformation of deformable region 103, in which case strain on strainable magnetoelastic subsection 108 may not be measurable. Exposing deformable region 103 to a force can refer to exposing the region to a force that is not equal to zero or exposing the region to a force that is equal to zero. In some aspects, the force may be determined as being equal to zero. In some aspects, sensor 100 can exhibit increased sensitivity with decreasing size of deformable region 103.

In some embodiments, analyzing strain with sensor 100 comprises detecting and/or measuring a signal indicative of a value or property, such as for example detecting or measuring a signal indicative of the induced voltage on pickup coil 105. Signal receiving device 115 is configured to receive an electrical signal representative of the time-varying electromagnetic field received by pickup coil 105. In some aspects, signal-receiving device 115 may further comprise a signal processor for analyzing the received electrical signal. In some embodiments, analyzing the received electrical signal and/or strain may comprise detecting and/or quantifying at least one component (amplitude and/or phase) of the complex amplitude of the received electrical signal. In some embodiments, analyzing strain can include comparing the at least one component with a reference component of complex amplitude or with a selected reference value. In some aspects, if the at least one component of the complex amplitude of the electromagnetic field received by pickup coil 105 is different from the reference component of complex amplitude, strainable magnetoelastic subsection 108 may be determined to have undergone a strain. In some aspects, analyzing strain can comprise measuring both the amplitude and phase components of the complex amplitude of the time-varying electromagnetic field received by pickup coil 105. Exemplary changes in the amplitude component of complex amplitude, observed in response to strain, may include reduced or increased amplitude of the time-varying electromagnetic field depending on the sign of the magnetoelastic coefficient and the configuration of the sensor. In some embodiments, changes in the complex amplitude of the time-varying magnetic field received by pickup coil 105, in response to deformation of deformable region 103 caused by a force, are proportional to deformation-induced strain and to the magnitude of forces acting on deformable region 103. Methods described herein for analyzing strain can be used for analyzing a force acting on deformable region 103. Computational methods may be employed to relate a measurement of strain to a measurement of force.

In some aspects, a reference component of complex amplitude may be determined by exposing mechanically deformable region 103 to a known or "reference" force, and measuring the reference component of complex amplitude of the time-varying electromagnetic field received by pickup coil 105. In some aspects, the reference force is zero, and in some aspects the reference force is not zero.

In some embodiments, a time-varying magnetic field may be induced by drive coil 106 prior to sample analysis and exposure to a force. In some embodiments, exposure of deformable region 103 to a force that may cause deformation occurs prior to induction of the time-varying electromagnetic field. Although the order of analyzing steps may be varied according to preference or operational needs, in many embodiments, strain analysis comprises comparing at least one component of complex amplitude of the time-varying electromagnetic field received by pickup coil 105, in response to strain on strainable magnetoelastic subsection 108, with a corresponding component of complex amplitude determined for a reference strain or force.

In sensor embodiments, magnetic flux guide 104 comprises magnetoelastic section 107 and strainable magnetoelastic subsection 108. Strainable magnetoelastic subsection 108 can be configured to be strainable by deformation of deformable region 103. For example, in some aspects, strainable magnetoelastic subsection 108 comprises magnetoelastic material positioned on deformable region 103. In some aspects, some magnetoelastic material positioned on non-deformable region 102, such as for example magnetoelastic material positioned adjacent to linking structure 109, may also undergo deformation-induced strain.

Strainable magnetoelastic subsection 108 is that part of magnetoelastic section 107 positioned between drive coil 106 and pickup coil 105, which can be strained by deformation of mechanically deformable region 103. In some embodiments, all of magnetoelastic section 107 need not be disposed and configured to be strainable. The size and/or shape of strainable magnetoelastic subsection 108 can vary in different sensor embodiments. In many embodiments, magnetoelastic section 107 can comprise a strainable magnetoelastic subsection 108 having different levels of strainability depending on the location within the subsection. The size and shape of strainable magnetoelastic subsection 108 can be adjusted during sensor design and manufacturing. In many embodiments, sensor 100 is designed with specific sensing capabilities and for operation with a known range of force. In some aspects, strainable magnetoelastic subsection 108 may be highly localized within magnetoelastic section 107 or may extend across all or most of magnetoelastic section 107. It is not a requirement that magnetoelastic section 107 and/or magnetoelastic subsection 108 be present as a layer or film covering the entirety of deformable region 103. In some aspects, exemplary useful analytical modeling methods for design of strainable magnetoelastic subsection 108 may include solving boundary-value problems, such as using the Newtonian approach or the extended Hamilton's principle. Examples of useful computational modeling techniques include discrete differentiation or finite element methods.

The exemplary sensor embodiment shown in FIG. 1A comprises pickup coil 105 wound around a region of magnetic flux guide 104 that is positioned on and integrated with mechanically deformable region 103. Drive coil 106 is wound around a different region of magnetic flux guide 104 and is positioned on and integrated with non-deformable region 102. This embodiment represents only one exemplary configuration for the arrangement of magnetic flux guide 104 and coils 105, 106 in a sensor 100.

Magnetic flux guide 104 can take any of a variety of shapes. The shape of magnetic flux guide 104 may be adapted for any of numerous reasons, such as for example only, to enhance coupling of drive coil 106 and pickup coil 105, to conform to the shape of mechanically deformable region 103 so as to enable specific applications of sensor 100, to increase sensor sensitivity, and/or to enable manufacturability of sensor 100. The time-varying magnetic field (i.e., electromagnetic flux) coupled into magnetic flux guide 104 from drive coil 106 can be dependent on any of several factors such as the winding number and/or geometry in the drive coil 106 and/or pickup coil 105, the width of either or both coils, the composition of either or both the coils, and the thickness of either or both coils. In some embodiments, drive coil 106 and pickup coil 105 may comprise one or more than one of Au, Ag, Cu, and Al. It is not a requirement that the drive and pickup coil of sensor 100 be made from the same material. In some embodiments, the thickness of drive coil 106 and/or pickup coil 105 may range from about 20 nm to about 5 inclusive. In some aspects, the thickness of drive coil 106 and/or pickup coil 105 may range from about 30 nm to about 500 nm inclusive. In some aspects, the thickness of coil 106 and/or pickup coil 105 may range from about 50 nm to about 200 nm inclusive. In some embodiments, the thickness of drive coil 105 and pickup coil 106 can be different from each other. In some aspects, drive and pickup coils may be formed through deposition and liftoff or deposition and etching, and coil thickness can be dependent on the amount of material deposited.

In sensor embodiments, drive coil 106 and pickup coil 105 may have the same geometric configuration or they may have different geometric configurations. In some aspects, exemplary geometric configurations for coils can include solenoidal type, spiral type, and toroidal-meander type (Ahn et al., 1996, *Proc. 4th Symp. Magnetic Materials Processes and Devices*, 95-18:411-425). In some aspects, one or more selected coil configurations may be used to modify electromagnetic properties of the inductive coupling between the drive and pickup coils and the transformer core, to alter the geometry of the microtransformer, and/or to comply with limitations of fabrication processes. Some exemplary electromagnetic properties of inductive coupling between the coils and the core that may be modified by using a different geometric configuration include the inductance, Q-factor, and/or frequency response of the inductor.

In many embodiments, drive coil 106 and pickup coil 105 comprise at least one loop. In some embodiments, drive coil 106 and pickup coil 105 may comprise a different number of loops, or drive coil 106 and pickup coil 105 may comprise the same number of loops. In some embodiments, at least one of drive coil 106 and pickup coil 105 has a width that is greater than the minimal width 112 of linking structure 109. In some aspects, at least one of drive coil 106 and pickup coil 105 has a width greater than about twice minimal width 112 of linking structure 109, greater than about 3× minimal width 112, greater than about 5× minimal width 112, or greater than about 10× minimal width 112. In some aspects, the width of drive coil 106 and the width of one or more pickup coil 105 are each greater than minimal width 112 of linking structure 109.

One aspect of the novel architecture of sensor 100 is the positioning of one or more of drive coil 106 and pickup coil 105 on non-deformable region 102. In some embodiments, the positioning of one or more of drive coil 106 and pickup coil 105 on non-deformable region 102, can reduce the necessary size of a cantilever and/or can enable the use of coils having thicknesses and/or widths that are larger than those that can be used when a coil is positioned on mechanically deformable region 103. In some aspects, positioning of one or more of drive coil 106 and pickup coil 105 on non-deformable region 102, can increase sensor sensitivity.

In some aspects, the induction coils that are drive coil 106 and pickup coil 105 may be interchangeable. That is, an induction coil functioning as pickup coil 105 in one sensor embodiment of the invention may be configured to function as drive coil 106 in another sensor embodiment. Similarly, an induction coil functioning as drive coil 106 in one sensor embodiment may be configured to function as pickup coil 105 in another sensor embodiment. In these aspects, the function of drive coil 106 and pickup coil 105 may be interchanged by connecting electrical current source 116 and signal receiving device 115 to the selected coil of choice for a given sensor embodiment. As used herein, "electrical current source" refers to the electronics that drive the time-varying electromagnetic field, though in some embodiments this may be achieved through signal generation means other than a controlled time-varying current source. For example, in some embodiments, a voltage source or a power source may be used to induce the time-varying electromagnetic field. Other means to induce the time-varying electromagnetic field may be known to a person having ordinary skill in the art.

The magnetic field H induced by a drive coil excited by a sinusoidal waveform, or a waveform that can be decomposed into sinusoidal contributions, with amplitude $I_0$ and angular frequency $\omega$, is given by:

$$H = \frac{N_1}{L_1}I = \frac{N_1}{L_1}I_0 e^{i\omega t}.$$

where $N_1$ is the number of turns in the drive coil and $L_1$ is the coil length. The resulting magnetic flux $\Phi$ through the pickup coil is:

$\Phi = N_2 A B = N_2 A \mu_0 (H+M)$, where $N_2$ is the number of turns in the pickup coil, A is the cross-sectional area of the core, B is the magnetic flux density, and M is the magnetization of the core. The induced electromagnetic flux (emf) is thus:

$$\varepsilon = -\frac{d\Phi}{dt} = -N_2 A \ \mu_0 \left(\frac{dH}{dt} + \frac{dM}{dt}\right) = -N_2 A \ \mu_0 \frac{dH}{dt}\left(1 + \frac{dM}{dH}\right)$$

$$= -N_2 A \ \mu_0 \frac{dH}{dt}(1 + \chi(H, \sigma))$$

$$= -N_2 A \ \mu_0 \left(\frac{N_1 I_0}{L_1}\right) i\omega e^{i\omega t}(1 + \chi(H, \sigma))$$

wherein the quantity $dM/dH \equiv \chi(H,\sigma)$ is identified as the strain-dependent susceptibility. Hence, the sensitivity of the induced emf to an applied strain a is:

$$\frac{d\varepsilon}{d\sigma} = -N_2 A \ \mu_0 \frac{dH}{dt}\frac{d\chi}{d\sigma}.$$

The relative sensitivity of the pickup coil induced emf amplitude to a changing applied strain is thus:

$$\frac{\Delta\varepsilon/\varepsilon}{\Delta\sigma} \approx \frac{d\varepsilon/d\sigma}{\varepsilon} = \frac{d\chi/d\sigma}{1+\chi}$$

The susceptibility can be approximated by the following formula:

$$\chi \approx \left(\frac{3a}{M_s} - \left(\alpha + \frac{9}{2}\frac{\lambda_s \sigma}{\mu_0 M_s^2}\right)\right)^{-1}, \frac{d\chi}{d\sigma} \approx \chi^2\left(\frac{9}{2}\frac{\lambda_s}{\mu_0 M_s^2}\right),$$

so that the relative strain sensitivity is approximately $$\frac{\Delta\varepsilon/\varepsilon}{\Delta\sigma} \approx \frac{9}{2}\frac{\lambda_s}{\mu_0 M_s^2}\left(\frac{\chi^2}{1+\chi}\right).$$

In many embodiments, sensitivity of sensor 100 is linearly dependent on the magnetoelastic coefficient $\lambda_s$ of magnetoelastic material in magnetic flux guide 104 and magnetoelastic section 107 and is enhanced by large $\chi$. Selecting a magnetoelastic material with a high $\lambda_s$ and $\chi$ can provide high sensitivity for detecting strain. A strain-sensitive, high magnetic susceptibility magnetoelastic material (also referred to as "magnetostrictive material" herein) can enhance coupling efficiency and thus sensitivity of the strain sensor. Some exemplary magnetostrictive materials for use in magnetic flux guide 104 and magnetoelastic section 107, individually and as alloys of two or more materials, include cobalt, gallium, terbium, iron, aluminum, dysprosium, nickel, holmium, thulium, yttrium, erbium, and samarium. In some aspects, useful magnetostrictive material can be Terfenol-D, which is an alloy of terbium, dysprosium and iron, and/or Galfenol, which is an iron-gallium alloy. In some embodiments, alloys of magnetostrictive materials may enable significantly increased sensor sensitivity. In most real materials, the susceptibility and magnetostrictive coefficients are inversely related. Therefore, balancing their values may be necessary to maximize sensor performance.

In many embodiments, high magnetic susceptibility materials useful for magnetoelastic sensing materials may have a susceptibility greater than 0.05. Some regions of the transformer do not require magnetoelastic properties, such as loop closures and selected regions of magnetic flux guide 104. In these regions, high magnetic susceptibility materials useful for guiding flux can have a susceptibility greater than 5. In some embodiments, a "compensating region" of transformer 110 may compensate for a magnetoelastic section in order to balance a differencing transformer, for example. Depending on the circuit design, in some aspects a compensating region may have magnetic susceptibility and, in some aspects, a compensating region may not have magnetic susceptibility.

Table 1 shows several relevant magnetostrictive materials and their magnetostrictive coefficients and susceptibilities. Magnetic materials are preparation-sensitive, and the values shown may be significantly influenced by processing conditions. However, standard theory for ferromagnets provides an approximation for the temperature dependence from the Langevin equation. As a result, for values lower than ~30% of the Curie temperature, $T_c$, there is no dependence on temperature. For temperatures higher than ~70% of $T_c$, the thermal energy causes a highly non-linear decrease in magnetization. Between those two $T_c$ values, the magnetization gradually decreases. Therefore, by focusing on materials with high $T_c$, the effect of temperature on sensor responsivity can be greatly reduced. For example, for cobalt, 30% of $T_c$ is ~150° C., so for temperatures below this value, there may be a negligible effect of temperature on sensor responsivity.

TABLE 1

Magnetostrictive coefficients, approximate range of magnetic susceptibility ($\chi$), and Curie temperatures ($T_c$) for exemplary magnetostrictive materials useful in some embodiments.

| Material | Magnetostrictive Coefficient $(3/2) \lambda_s \times 10^6$ | Susceptibility $\chi$ | Curie Temperature $T_c$ (° C.) |
|---|---|---|---|
| Ni | −50 | 110-600 | 360 |
| Fe | −14 | 150-200,000 | 770 |
| Co | −93 | 70-250 | 1130 |
| TbFe$_2$ | 2630 | 1-5 | 431 |
| DyFe$_2$ | 650 | 1-5 | 362 |
| Pr$_2$Co$_{17}$ and Tb$_2$Co$_{17}$ | 310 | 1-30 | 925 |

Some additional examples of strain-sensitive magnetostrictive materials that can be useful in some embodiments, their magnetostrictive coefficients, and their Curie temperatures, can be found in the art (Hathaway, et al., 1993, *MRS Bulletin,* April:34-41).

In some embodiments, magnetic flux guide 104 may be a composite and may comprise at least two sections, the sections comprising different magnetic material from each other. FIG. 2 is a schematic top view of a sensor embodiment having a composite flux guide 104 configured as a closed magnetic circuit. In some aspects, such as in the exemplary embodiment in FIG. 2, magnetoelastic section 107 (dark shading), having strainable subsection 108 comprises magnetoelastic material with a relatively high magnetoelastic coefficient. The remaining section 201 (light shading) of flux guide 104 comprises high magnetic susceptibility material, which may or may not have a measurable magnetoelastic coefficient. This "composite flux guide" can minimize flux loss in high magnetic susceptibility section 201 outside magnetoelastic section 107, thereby increasing the sensitivity of detection of deformation-induced strain.

In some embodiments such as that shown in FIG. 2, magnetoelastic section 107 is limited to the section of flux guide 104 that is nearer to deformable region 103 than is high magnetic susceptibility section 201 and is smaller compared to the high magnetic susceptibility section 201. In some aspects, coils 105, 106 are spiral type coils and are wound around a region of flux guide 104 that does not encompass magnetoelastic section 107.

Figure 3:
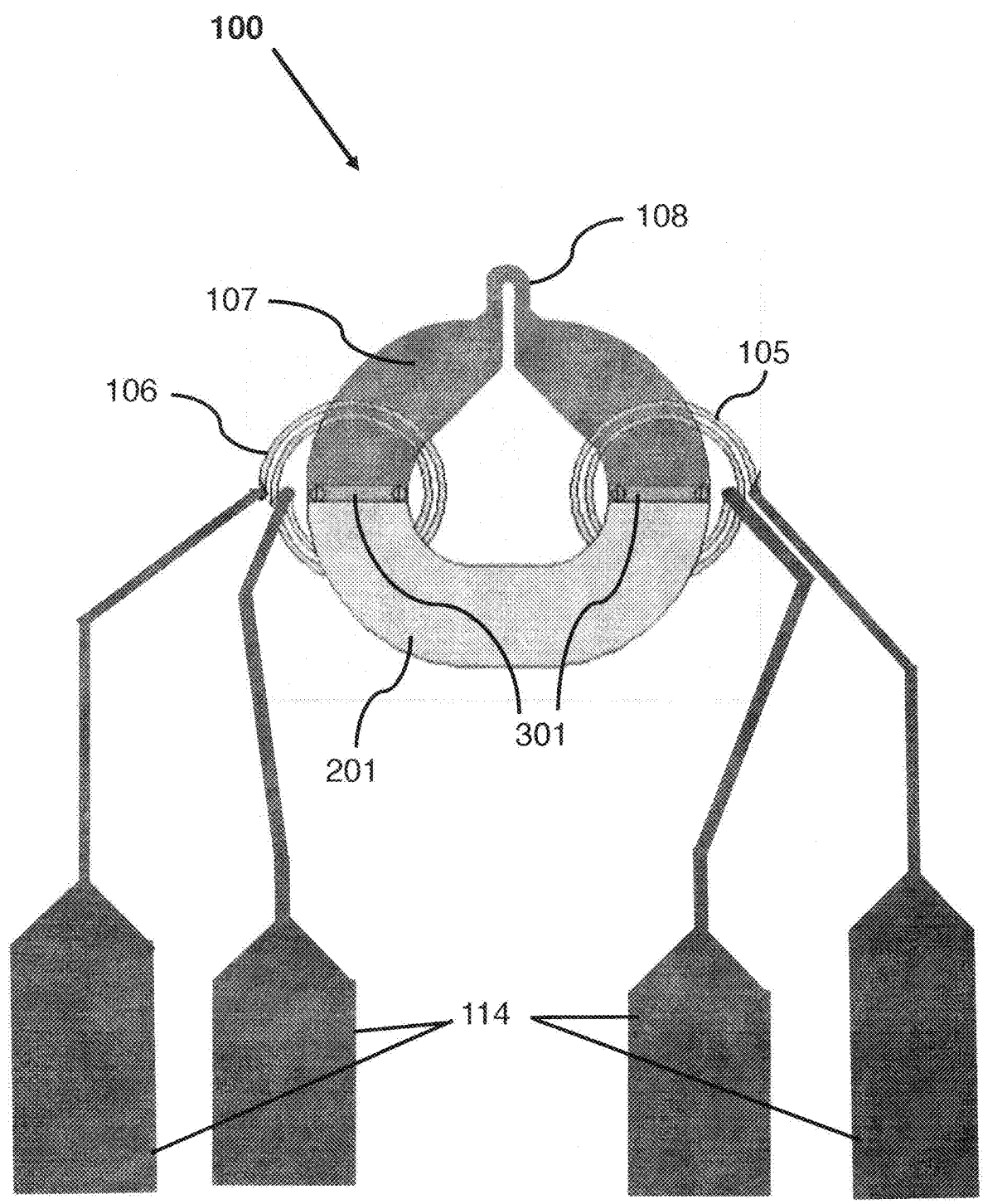
FIG. 3 is a schematic top view of selected elements of an embodiment comprising a composite flux guide wherein the magnetoelastic section and high magnetic susceptibility section overlap.

In some embodiments magnetoelastic section 107 can comprise a much larger portion of flux guide 104. For example, magnetoelastic section 107 may extend to a region of flux guide 104 that is positioned nearer to coils 105, 106 than that which is depicted in FIG. 2. In some aspects, coils 105, 106 may be wound around a region of flux guide 104 that comprises a part of magnetoelastic section 107 and a part of high magnetic susceptibility section 201 as is shown in FIG. 3. FIG. 3 is a schematic top view of selected elements of an embodiment comprising a composite flux guide wherein magnetoelastic section 107 and high magnetic susceptibility section 201 overlap. (For ease of viewing, only selected elements of sensor 100 are shown in FIG. 3.) In some aspects, magnetoelastic section 107 and high magnetic susceptibility section 201 overlap each other at overlap regions 301 in flux guide 104. In some embodiments, this conformation may aid with coupling of drive and pickup coils 106, 105. In some aspects one or more of coils 105, 106 may be wound around an overlap region 301 which comprises overlapping magnetoelastic section 107 and high magnetic susceptibility section 201.

In some embodiments, sensor 100 may incorporate various combinations of these structural embodiments. As in FIG. 1A, the entirety of flux guide 104 may comprise magnetoelastic material. The size of magnetoelastic section 107 and high magnetic susceptibility section 201 may be selected based on sensor applications or for other reasons, such as for example manufacturing considerations.

In some embodiments, magnetic materials useful for high magnetic susceptibility section 201 can include materials with a magnetic susceptibility greater than or equal to about 5. In some embodiments, magnetic materials with a magnetic susceptibility of about 5,000 may be preferred. In some aspects, magnetic materials with a magnetic susceptibility greater than about 5,000 may be preferred. For composite flux guide embodiments, materials useful for high magnetic susceptibility section 201 can be by way of example only, Fe, ferrite, and alloys such as Ni—Fe (permalloy) and Ni—Fe—Mo (supermalloy). In these embodiments, magnetoelastic materials that can be useful in magnetoelastic section 107 include by way of example only, Co, Terfenol-D, galfenol, and SmFe$_2$. In some embodiments, other materials can be useful for high magnetic susceptibility section 201 and magnetoelastic section 107 and may be determined experimentally by a person of skill in the art.

As used herein, "magnetic material" and "magnetic materials" are used interchangeably. For example, high magnetic susceptibility section 201 and magnetoelastic section 107 each comprise "magnetic material". In some embodiments of the invention, "magnetic material" can refer to a single type of material, and in other embodiments "magnetic material" can refer to a plurality of types of magnetic material. In some embodiments wherein different sections of flux guide 104 are said to comprise the same material or materials, it is meant that the sections can have the same material or materials in the same or about the same relative amounts.

In some embodiments, such as in the exemplary embodiment shown in FIG. 2, drive coil 106 and pickup coil 105 can both be positioned on non-deformable region 102. Here, mechanically deformable region 103 is a region of cantilever 120. The size and shape of mechanically deformable region 103 can vary among different sensor embodiments. In some aspects, such as that shown in FIG. 2, mechanically deformable region 103 on sensor 100 can comprise areas having different widths. As shown here, cantilever 120 tapers at free end 121, and the width of mechanically deformable region 103 decreases with tapering cantilever 120, forming cantilever tip 202. It is to be noted that minimal width 112 of linking structure 109 is the shortest side to side extent of linking structure 109 and is measured parallel to the adjacent edge 113 of non-deformable region 102. Therefore, in some embodiments, minimal width 112 is greater than the smallest width of deformable region 103, e.g. as in FIG. 2 where the smallest width of mechanically deformable region 103 is at tip 202 in this exemplary embodiment. For cantilevers comprising a tip 202, tip 202 generally is pointing downward from the top of sensor 100 (into the page) or upward toward the top of sensor 100 (outward from the page).

In some embodiments, magnetoelastic section 107 can comprise a plurality of strainable magnetoelastic subsections 108, each subsection configured to be strainable by deformation of mechanically deformable region 103. In some embodiments, at least a portion of the time-varying electromagnetic field induced by drive coil 106 passes through each strainable magnetoelastic subsection 108, and pickup coil 105 is disposed and configured to receive at least a portion of the time-varying electromagnetic field that passes through each strainable magnetoelastic subsection. In the sensor embodiment shown in FIG. 2, flux guide 104 comprises magnetoelastic section 107 and high magnetic susceptibility section 201. Magnetoelastic section 107 comprises two separate strainable magnetoelastic subsections 108, wherein each strainable magnetoelastic subsection 108 is positioned on an area of deformable region 103 that causes maximal deformation-induced strain and is near cantilever fixed end 122. In some aspects, strainable subsections 108 may be separated by a region of magnetoelastic section 107 that is not strainable, as is shown in FIG. 2. In some aspects, at least two strainable subsections 108 may be contiguous with non-deformable region 102, also shown in FIG. 2.

In some embodiments, the closed magnetic circuit configuration of flux guide 104, two strainable magnetoelastic subsections 108, and the composite flux guide 104 can contribute to enhanced magnetic flux shielding and enhanced sensitivity of detection and measurement of strain by sensor 100.

In some embodiments, e.g., in FIG. 2, sensor 100 can comprise a signal-receiving device 115 electrically connected to pickup coil 105, and electrical current source 116 electrically connected to drive coil 106, wherein both of 115 and 116 are positioned off substrate 101.

Figure 4:
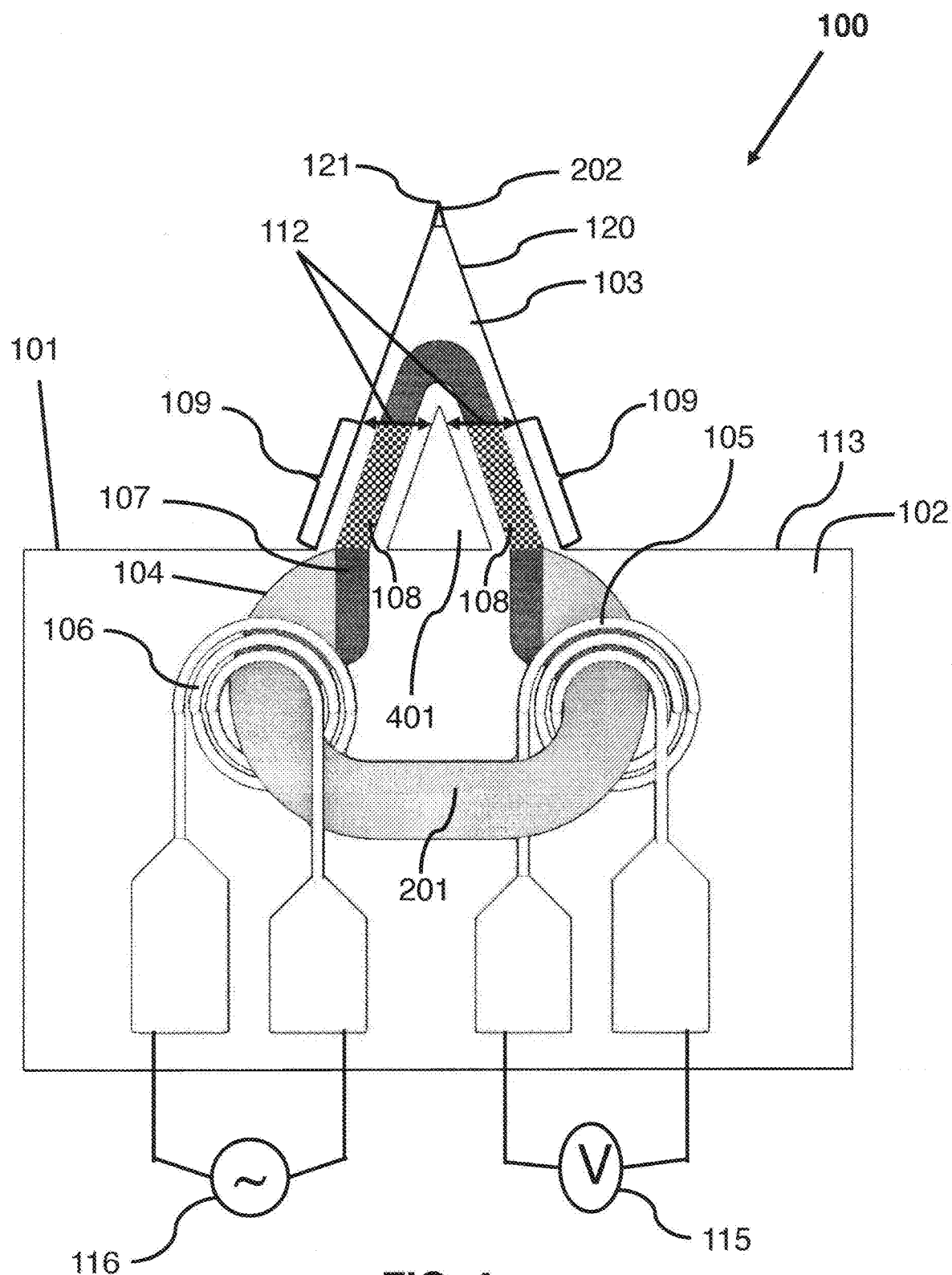
FIG. 4 is a schematic top view of an embodiment of a sensor having a composite flux guide that is configured as a closed magnetic circuit and a linking structure having a plurality of sections.

FIG. 4 is a schematic top view of an embodiment in which sensor 100 comprises a composite flux guide 104 configured as a closed magnetic circuit, and linking structure 109 comprises a plurality of sections. In some embodiments, as depicted here deformable region 103 can be a region of cantilever 120, here a triangular cantilever. Also, as shown in this exemplary embodiment, substrate 101 can comprise triangular cantilever 120 surrounding void 401. Magnetoelastic section 107 is configured so as to position a plurality of strainable magnetoelastic subsections 108 on deformable region 103. Here linking structure 109 comprises two sides of triangular cantilever 120. Linking structure 109 is that part of mechanically deformable region 103 extending outward from edge 113 of non-deformable region 102 to the furthest extent of strainable subsection 108, on deformable region 103. Minimal width 112 of linking structure 109 is the shortest side to side extent of linking structure 109 and is measured parallel to the adjacent edge 113 of non-deformable region 102. In embodiments such as the open triangular cantilever depicted in FIG. 4, minimal width 112 is the sum of the widths of the two arms of the triangular cantilever comprising strainable subsections 108. Therefore, as shown here, minimal width 112 is the sum of the lengths of the two lines indicated.

Figure 5A:
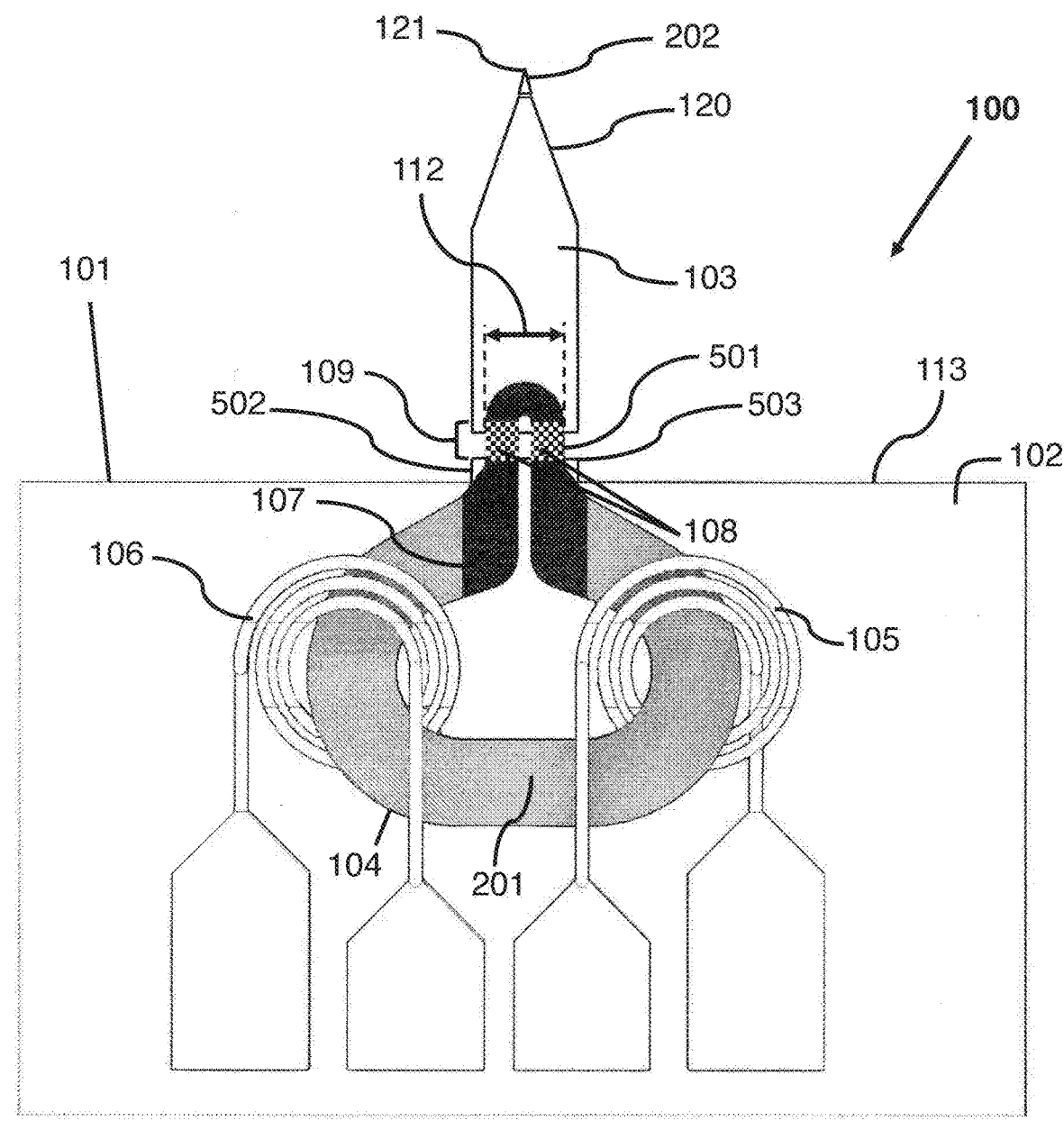
FIG. 5A and FIG. 5B are schematic top views of embodiments in which the strainable magnetoelastic subsection of a sensor comprises suspended magnetoelastic material.
Figure 5B:
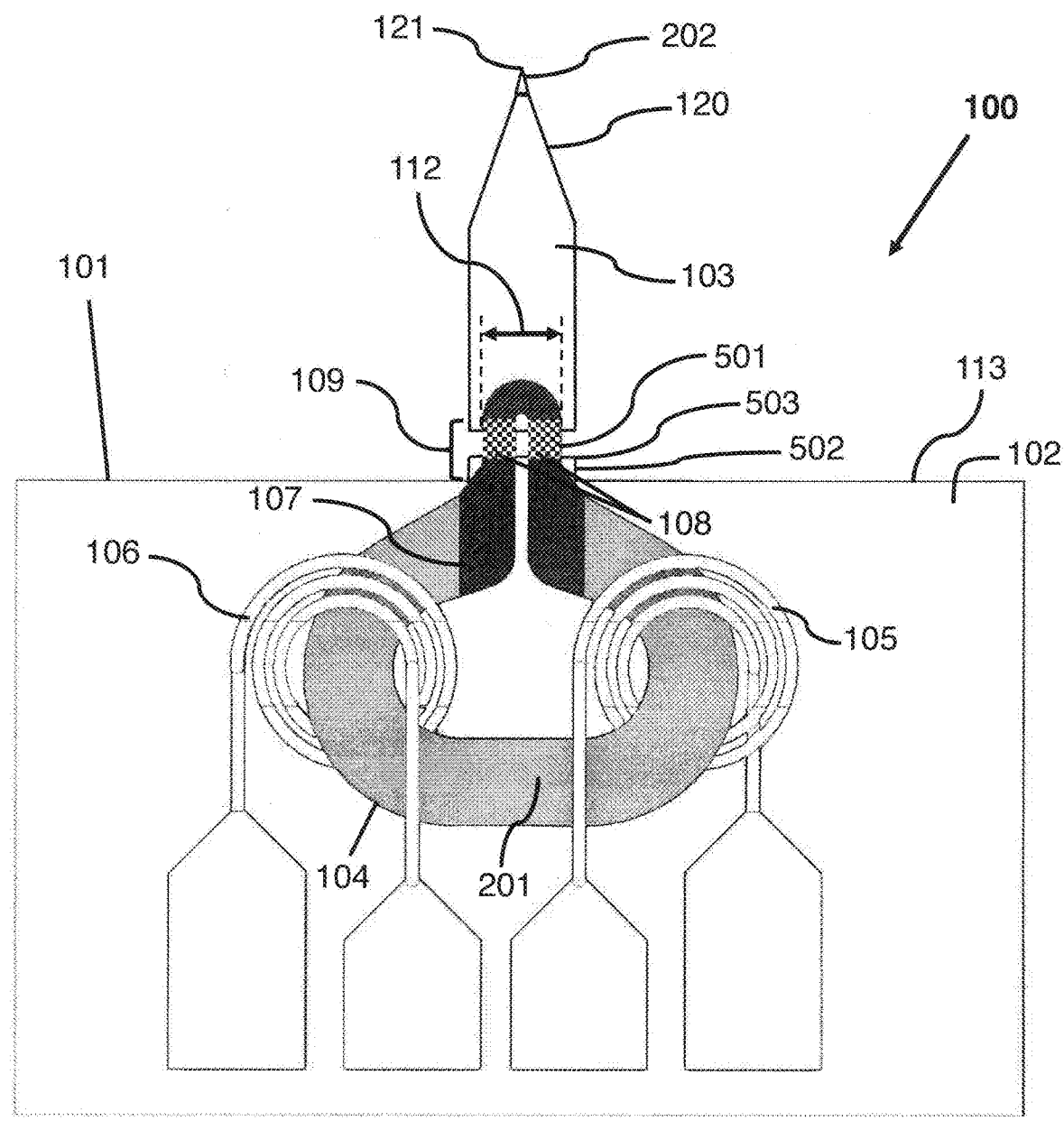

FIG. 5A and FIG. 5B are schematic top views of embodiments in which strainable magnetoelastic subsection 108 comprises suspended magnetoelastic material. These sensor embodiments may have enhanced sensitivity for detecting deformation-induced strain. In these embodiments, substrate extension 502 is adjoined to non-deformable region 102. In some aspects, substrate extension 502 can be mechanically deformable, in which case mechanically deformable region 103 of substrate 101 comprises substrate extension 502. In some aspects, substrate extension 502 may not be mechanically deformable, in which case non-deformable region 102 of substrate 101 comprises substrate extension 502.

For purposes of description, in the embodiment depicted in FIG. 5A, substrate extension 502 is non-deformable and non-deformable region 102 comprises substrate extension 502. In this embodiment, substrate extension edge 503 is the edge of non-deformable substrate extension 502. In this exemplary embodiment, strainable magnetoelastic subsection 108 comprises suspended magnetoelastic material 501 and spans the space between deformable region 103 and non-deformable region 102 (non-deformable region 102 here comprising substrate extension 502). Suspended magnetoelastic material 501, being part of strainable subsection 108, is strainable by deformation of mechanically deformable region 103. In some aspects, as here, mechanically deformable region 103 further comprises suspended magnetoelastic material 501, and as such, linking structure 109 also comprises suspended magnetoelastic material 501. Linking structure 109 is that part of mechanically deformable region 103 extending outward from non-deformable substrate edge, here edge 503, to the furthest extent of strainable magnetoelastic subsection 108, on mechanically deformable region 103. For purposes of the invention, minimal width 112 of linking structure 109 is defined as the shortest side to side extent of linking structure 109 and is measured parallel to the adjacent edge of non-deformable region 102, here edge 503.

In the embodiment depicted in FIG. 5B, substrate extension 502 is mechanically deformable and, as such, mechanically deformable region 103 comprises substrate extension 502. Edge 113 is the edge of non-deformable region 102. In these aspects, mechanically deformable region 103 further comprises suspended magnetoelastic material 501 and substrate extension 502. Linking structure 109 is that part of mechanically deformable region 103 extending outward from non-deformable substrate edge, here edge 113, to the furthest extent of strainable subsection 108, on mechanically deformable region 103. As in the embodiment depicted in FIG. 5A, minimal width 112 of linking structure 109 is defined as the shortest side-to-side extent of linking structure 109 and is measured parallel to the adjacent edge of non-deformable region 102, here edge 113.

Some embodiments can be useful for applications in scanning probe microscopy (SPM), including high-resolution atomic force microscopy (AFM). In some aspects, such as these, cantilever 120 can comprise tip 202 at cantilever free end 121. Embodiments having cantilever 120 with tip 202 are depicted at least in FIGS. 2 and 4. Cantilever 120 has a "top" side and a "bottom" side with tip 202 positioned on either side. In some embodiments, cantilever tip 202 may be positioned on the same side of substrate 101 as is transformer 110, referred to herein for purposes of description as a "top" side of cantilever 120. In some embodiments, tip 202 may be positioned on the opposing "bottom" side of cantilever 120. In some embodiments, such as for example with contact mode AFM, tip 202 is in contact with the sample surface. In contact mode AFM, cantilever tip 202 may be mechanically scanned across a sample surface, while in contact with the surface. Interactions between tip 202 and the sample surface may generate a force that causes deflection of cantilever 120. A force-induced deflection of cantilever 120 may result in deformation of mechanically deformable region 103 and in deformation-induced strain on strainable magnetoelastic subsection 108. Deformation-induced strain on strainable magnetoelastic subsection 108 may induce a change in the coupling of the induced time-varying electromagnetic field, between drive coil 106 and pickup coil 105. The resulting change in the induced voltage on pickup coil 105 can be proportional to the deformation-induced strain. In some embodiments, signal processing, by signal receiving device 115 having a signal processor, can comprise executing one or more algorithm and can enable measurement of forces that induce deflection of cantilever 120. Analyses of these forces can enable the determination of for example, atomic, electric, magnetic, chemical, and structural properties of a sample. One exemplary structural property of a sample that may be determined or measured is the topography of the sample surface so as to produce an image of the surface.

In some embodiments, sensor 100 can be configured to operate in a resonating mode, and mechanically deformable region 103 can be a region of a microresonator. In some aspects, mechanically deformable region 103 may be a region of a cantilever 120 that is a microresonator (also referred to as a "resonant cantilever"). It is to be noted that in some aspects, a "region of a cantilever" can be less than an entire cantilever, can be anywhere on a cantilever, or can be an entire cantilever. Resonant cantilevers can be used with contact mode AFM, but are more commonly used with non-contact mode AFM and tapping mode (intermittent contact mode) AFM.

In some embodiments, such as when mechanically deformable region 103 is a region of a microresonator, analyzing and measuring strain with sensor 100 can comprise inducing a periodic mechanical oscillation of the microresonator; exposing mechanically deformable region 103 to a force; inducing with drive coil 106, a time-varying electromagnetic field having at least one frequency that is at least about two times the frequency of the induced periodic mechanical oscillation; receiving, with pickup coil 105, at least a portion of the induced time-varying electromagnetic field that passes through strainable magnetoelastic subsection 108; measuring at least one property of an electrical signal representative of the time-varying electromagnetic field received by pickup coil 105; and comparing the at least one measured property with a reference value. In some aspects, the at least one measured property can be at least one component of complex amplitude of the electrical signal. In some aspects, the at least one component is one or both of the amplitude and the phase of the complex amplitude. In some embodiments, the reference value can be a corresponding measured property of an electrical signal measured for a reference force, or the reference value can be a corresponding measured property of an electrical signal measured in the absence of force. If the at least one component of complex amplitude of the electrical signal representative of the time-varying electromagnetic field received by the pickup coil is different from the reference value, strainable subsection 108 may be determined to have undergone a strain, induced by deformation of mechanically deformable region 103 in response to a force. In some aspects, analyzing a received electrical signal can comprise detecting and/or measuring strain by evaluating characteristics of the electrical signal or by comparing characteristics of the electrical signal to those of a reference electrical signal and in other aspects can comprise comparing characteristics of the electrical signal to a selected reference value.

Numerous means for inducing a periodic mechanical oscillation of a microresonator are known to those having ordinary skill in the art. In some aspects, mechanical oscillation of a microresonator can be induced externally, using a device not present on substrate 101. In some aspects, mechanical oscillation can be induced locally, such as for example by actuation occurring on the substrate or cantilever. In some embodiments, the induced periodic mechanical oscillation of the microresonator may be at or near the resonant frequency of the microresonator, such as for example only, within the 5 dB bandwidth of a resonant frequency of the microresonator or within about a plus or minus 2.5 dB bandwidth of a resonant frequency of the microresonator. In some aspects, the periodic mechanical oscillation can induce a periodic strain in strainable magnetoelastic subsection 108. In these aspects, the periodic strain can be monitored to detect and/or measure a force that causes deformation of mechanically deformable region 103 or a force that does not cause deformation.

In some embodiments, the time-varying electromagnetic field induced by drive coil 106 has at least one frequency that is greater than or equal to about two times (2×) the frequency of the induced periodic mechanical oscillation of the microresonator and is not greater than about 10 GHz. In some embodiments, the time-varying electromagnetic field induced by drive coil 106 has at least one frequency greater than or equal to about 1 kHz and less than or equal to about 10 GHz, and the induced periodic mechanical oscillation of the microresonator has a frequency less than or equal to about one-half times (0.5×) that of the at least one frequency of the time-varying electromagnetic field induced by drive coil 106. In some aspects, the peak-to-peak voltage used to excite the drive coil to induce the time-varying electromagnetic field can be from about 100 µV to about 10 V, or from about 1 mV to about 2 V, or from about 1 mV to about 1V.

In some embodiments, analyzing strain with a sensor in which mechanically deformable region 103 is a region of a microresonator can comprise exposing mechanically deformable region 103 to a force, inducing with drive coil 106 an electrical signal comprising a plurality of time-varying electromagnetic fields at different frequencies wherein at least one frequency is at least about two times the frequency of a resonant frequency of the microresonator, and wherein at least one additional frequency induces a periodic mechanical excitation of the microresonator, the at least one additional frequency being within about plus or minus 2.5 dB bandwidth of the resonant frequency of the microresonator, receiving with pickup coil 105 an electrical signal comprising the plurality of time-varying electromagnetic fields, and comparing the received plurality of time-varying electromagnetic fields with one or more reference values. By way of example only, in some aspects where the microresonator is a resonant cantilever, the fundamental resonant frequency of the cantilever can be from about 1 kHz to about 5 MHz inclusive.

In some aspects, periodic mechanical oscillation of the microresonator may be induced by exciting drive coil 106 with an alternating current (AC). The microresonator may be induced to oscillate at a selected frequency, wherein the microresonator excitation field passes through magnetic flux guide 104, and the resulting magnetostriction in magnetic flux guide 104 causes a periodic deformation of the microresonator. In some aspects, this effect may be strongest at time-varying frequencies at or near the resonant frequency of the microresonator. In some embodiments, the microresonator excitation frequency may be accompanied by a separate measurement drive signal that is at least about 2× the frequency of the microresonator excitation frequency, where both signals are present in a linear superposition. In some aspects, where magnetostrictive effects are undesirable, the frequencies in the drive coil can be selected to be detuned from known resonances of the microresonator by at least about 1% of the frequency, or by at least one full-width at half-max of any mechanical resonance response peak.

In some embodiments, a cantilever may comprise a microresonator that may be induced to oscillate without oscillation of the cantilever or at a different frequency than that of an induced oscillation of the cantilever.

In some embodiments, additional steps for analyzing and measuring strain can comprise exposing deformable region 103 of a microresonator to a force, receiving with pickup coil 105 at least a portion of the time-varying electromagnetic field that passes through strainable magnetoelastic subsection 108, measuring at least one component (amplitude and/or phase) of the complex amplitude of the time-varying electromagnetic field that is received by pickup coil 105 in response to strain, and comparing the at least one component with a reference component of complex amplitude.

In some embodiments, the response of the complex amplitude as a function of strain can be measured or otherwise calibrated for the purpose of quantifying and identifying the strain induced by an unknown force. Additional means for monitoring changes in amplitude can comprise standard lock-in measurements of the measured signal, use of a phase-locked loop to monitor deviations in the phase caused by strain, heterodyning input and output signals, applying a low-pass filter to the output signal, and/or using a sensor 100 having a transformer in a "differencing configuration" or "differential configuration". Examples of strain gauges having transformers in differential configurations (differential transformers) include linear variable differential transformers.

Figure 6:
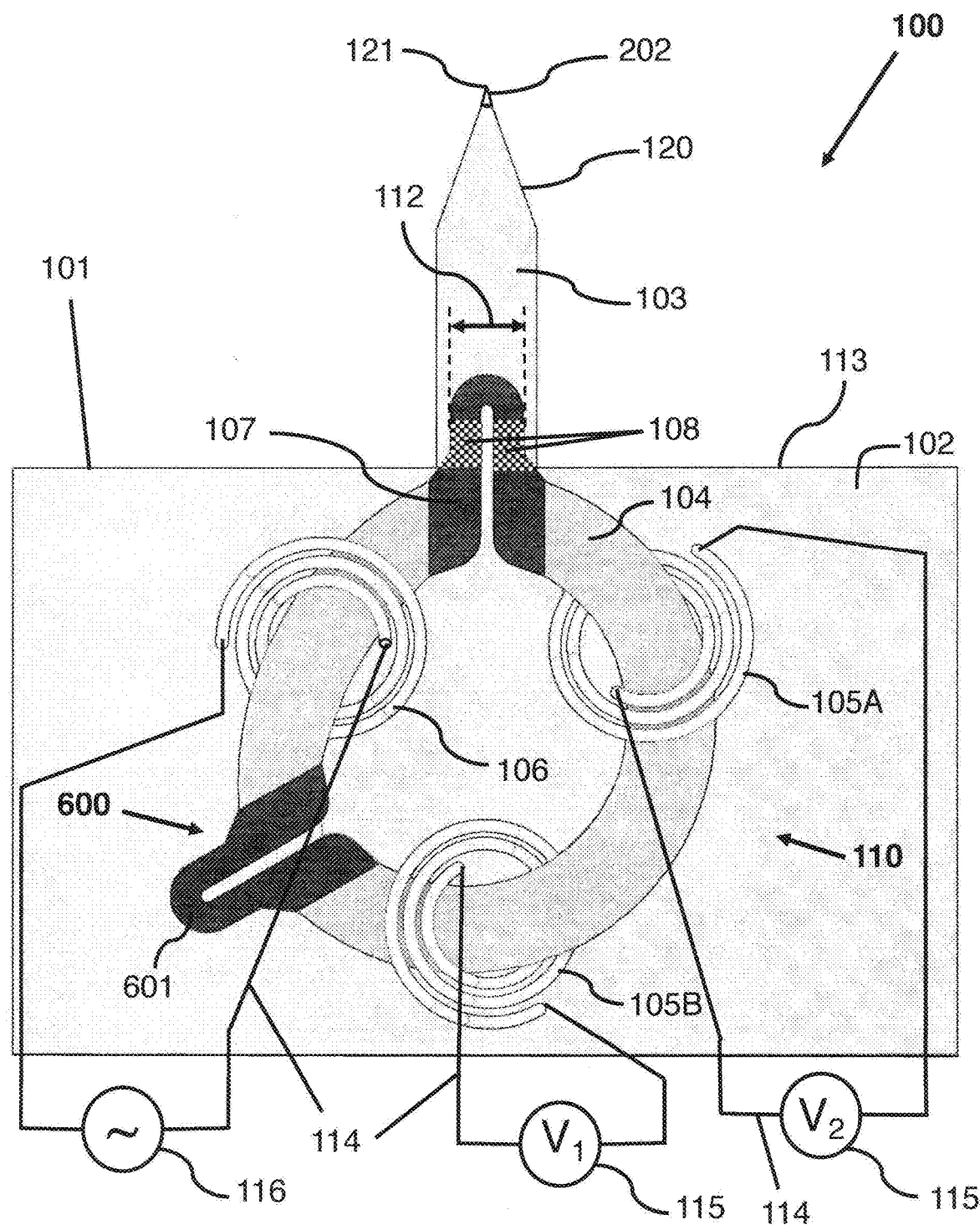
FIG. 6 is a top view schematic diagram of a sensor having a transformer in a differencing configuration.

FIG. 6 is a top view schematic diagram of a sensor embodiment having a transformer in a differencing configuration. (For ease of viewing, here electrical contacts 114 are represented with lines connecting drive coil 106 to current source 116 and pickup coils 105 to signal receiving device 115.) Sensor 100 having transformer 110 in a differencing configuration is also referred to herein as a "differencing sensor". In this embodiment (FIG. 6), sensor 100 is a differencing sensor in a closed magnetic circuit configuration and comprises a single drive coil 106 and a plurality of pickup coils 105A, 105B. In some embodiments, each pickup coil 105 can be configured to receive at least a portion of the time-varying electromagnetic field that passes through strainable magnetoelastic subsection 108. In this exemplary embodiment, pickup coils 105A and 105B are connected to separate signal-receiving devices 115 ($V_1$, $V_2$), and as such, can provide separate electrical signal readouts and in some embodiments, signal processing.

In the embodiment shown in FIG. 6, drive coil 106 and pickup coils 105 are positioned on non-deformable region 102. Magnetic flux guide 104 may comprise optional compensating section 601 positioned in compensating region 600. Optional compensating section 601 can be positioned on non-deformable region 102 between drive coil 106 and pickup coil 105. In some aspects, optional compensating section 601 may be positioned, for example, between drive coil 106 and pickup coil 105B. In many embodiments, optional compensating section 601 is not positioned between drive coil 106 and a pickup coil (such as for example 105A here) where section 601 would be adjacent to magnetoelastic subsection 108. The embodiment depicted in FIG. 6 is configured to reduce background signal passing to pickup coils 105A, 105B, such that the signal to background ratio (contrast) can be increased thereby improving sensor sensitivity.

In some aspects, wherein magnetic flux guide 104 and magnetoelastic section 107 comprise the same magnetic material, optional compensating section 601 can also comprise the same type of magnetic material. In some aspects wherein the magnetic material in magnetic flux guide 104 and magnetoelastic section 107 are different, optional compensating section 601 may comprise either the same type of magnetic material as is present in magnetoelastic section 107 or different magnetic material having similar magnetic susceptibility as the magnetic material present in magnetoelastic section 107. In some embodiments for operation in differential mode, a differencing sensor can have two pickup coils 105 oriented in the same direction. In some embodiments, for operation in summation mode, a sensor can have two pickup coils 105 oriented in opposite directions.

In some aspects for operation in differential mode, the induced voltage in one pickup coil 105 is subtracted from the induced voltage in the other pickup coil 105 yielding a voltage difference. In these aspects, in the absence of force acting on mechanically deformable region 103, the voltage difference may be at or near zero. In the presence of a force (not equal to zero) that causes deformation-induced strain, the pickup coils may receive different portions of the induced time-varying electromagnetic field and the voltage difference will be proportional to the force on mechanically deformable region 103. In some embodiments, the use of a differencing sensor for measuring force may enhance sensor sensitivity.

In some embodiments, analyzing strain with a differencing sensor comprises exposing mechanically deformable region 103 to a force, inducing a time-varying electromagnetic field with drive coil 106, receiving with first pickup coil 105A at least a portion of the induced time-varying electromagnetic field that passes through strainable magnetoelastic subsection 108, receiving with second pickup coil 105B at least a portion of the induced time-varying electromagnetic field that does not pass through strainable magnetoelastic subsection 108, and measuring at least one property of an electrical signal representative of the time-varying electromagnetic field received by each of the first and second pickup coils 105A, 105B. In some aspects, analyzing strain further comprises comparing the at least one property from first pickup coil 105A with the at least one property from second pickup coil 105B.

Figure 7:
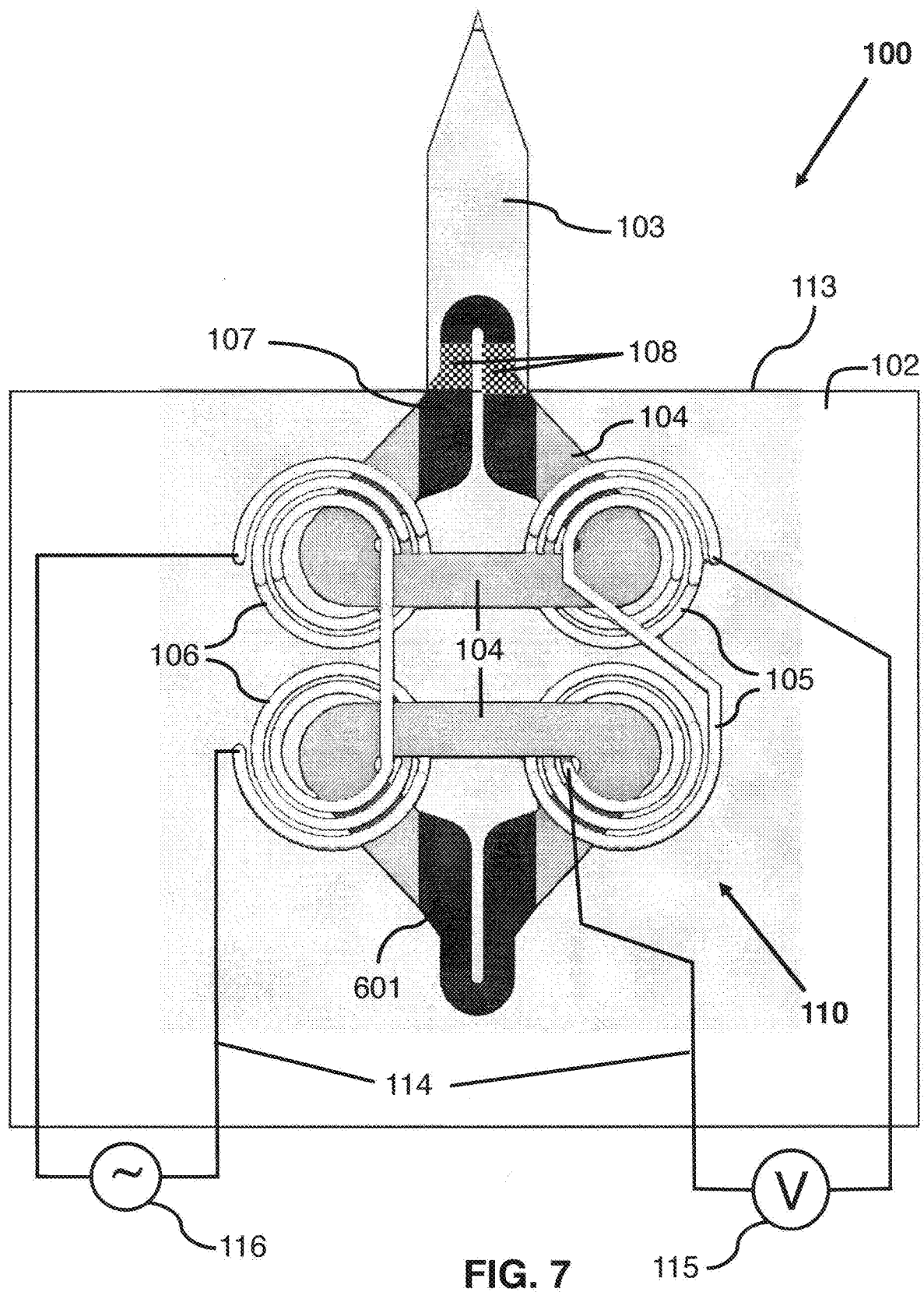
FIG. 7 is a top view schematic diagram of a sensor having a transformer in a split differencing configuration.

FIG. 7 is a top view schematic diagram of a differencing sensor having a transformer in a split differencing configuration. (Here, as for FIG. 6, electrical contacts 114 are represented with lines for ease of viewing.) For these embodiments sensor 100 is also referred to herein as a "split differencing sensor". In some embodiments, a sensor 100 that is a split differencing sensor can comprise magnetic flux guide 104 configured as a closed magnetic circuit and can comprise one or more drive coils 106 that are shared across two magnetic flux guides and one or more pickup coils 105 that are shared across the same magnetic flux guides as are the one or more drive coils. In the exemplary embodiment shown in FIG. 7, pickup coils 105 are electrically connected to the same signal-receiving device 115. In some embodiments, one or more pickup coils 105 are configured to receive at least a portion of the time-varying electromagnetic field that passes through strainable magnetoelastic subsection 108 and optional compensating section 601. Optional compensating section 601 can be configured to pass a reference flux that can be compared to the flux passed through strainable magnetoelastic subsection 108.

Figure 8:
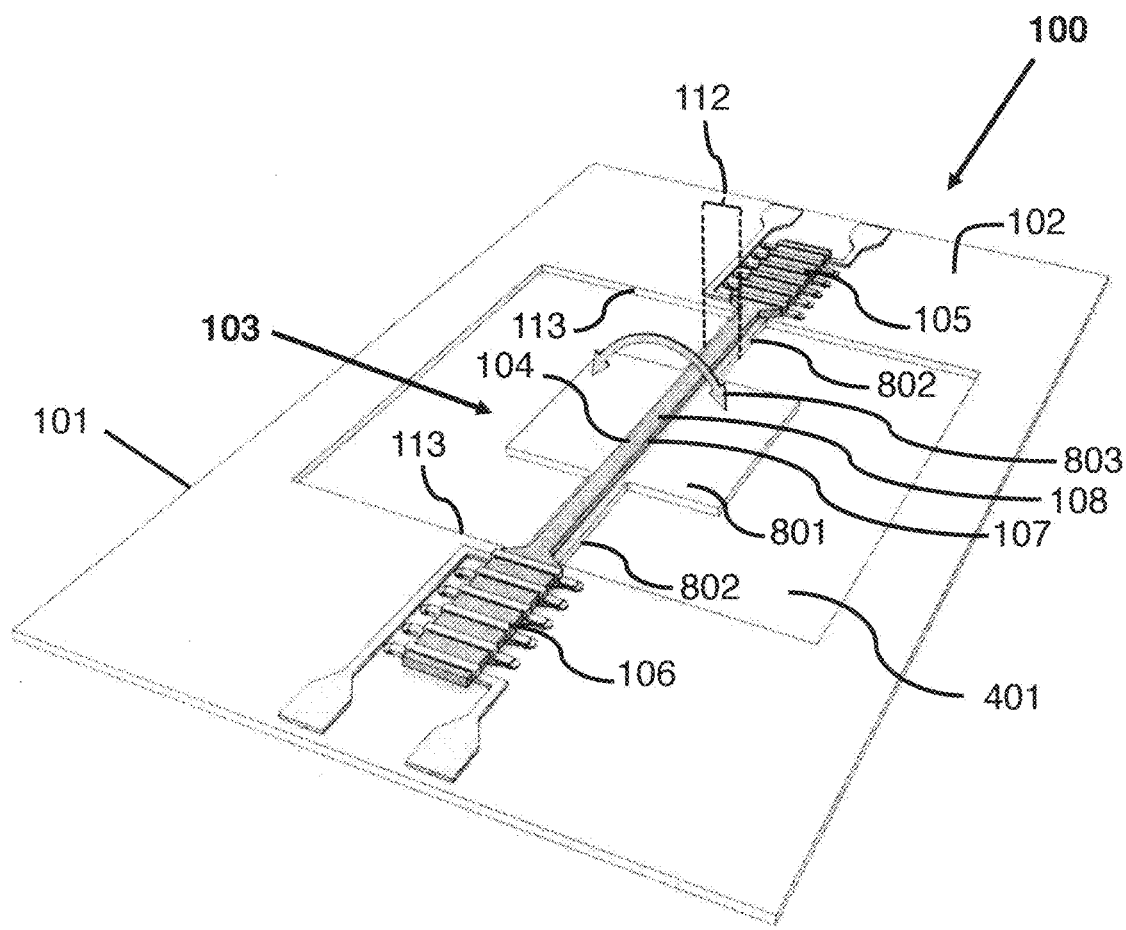
FIG. 8 depicts a schematic view of a sensor that can be used as a torsional resonator, in which the flux guide is a linear section of magnetic material.

In some embodiments, transformer 110 can comprise a magnetic flux guide 104 that is a linear section of magnetic material. In some of these embodiments, sensor 100 may be a resonator. FIG. 8 depicts a schematic view of a sensor that can be used as a torsional resonator, in which magnetic flux guide 104 is a linear section of magnetic material. Torsional resonators can be useful in applications such as for example thermal sensing, gyroscopes, microweighing, moisture sensing, chemical detection, and biofilm monitoring. In this embodiment (FIG. 8), the resonator comprises substrate 101 that surrounds void 401. Deformable paddle 801 is attached at opposing ends to non-deformable region 102 by deformable beams 802 that are affixed to non-deformable region 102. In this exemplary embodiment, mechanically deformable region 103 comprises a region of substrate 101 that spans void 401 and mechanically deformable region 103 includes deformable paddle 801 and deformable beams 802. In this exemplary embodiment, areas of strainable magnetoelastic subsection 108 that can experience maximal deformation-induced strain may be present on each deformable beam 802 at a position adjacent to the junction of each beam with non-deformable region 102, near edges 113. Arrow 803 indicates rotational deformation of paddle 801. In this exemplary embodiment, magnetic flux guide 104 and magnetoelastic section 107 comprise the same magnetic material, and strainable magnetoelastic subsection 108 spans the entire length of magnetic flux guide 104 that is positioned between opposing sides of non-deformable region 102. Sensor 100 embodiment depicted here is a sensor having a flux guide configured as an open magnetic circuit in which drive coil 106 and pickup coil 105 are coplanar and the magnetic field induced by drive coil 105 is in-plane with strainable magnetoelastic subsection 108.

In some embodiments, linking structure 109 may have a shape that is variable in width. Here linking structure 109, as in other sensor embodiments, is that part of mechanically deformable region 103 extending outward from non-deformable substrate edge 113, to the furthest extent of strainable subsection 108, on mechanically deformable region 103. Therefore, in this aspect (FIG. 8), linking structure 109 comprises all of mechanically deformable region 103, including deformable paddle 801 and deformable beams 802.

Figure 9:
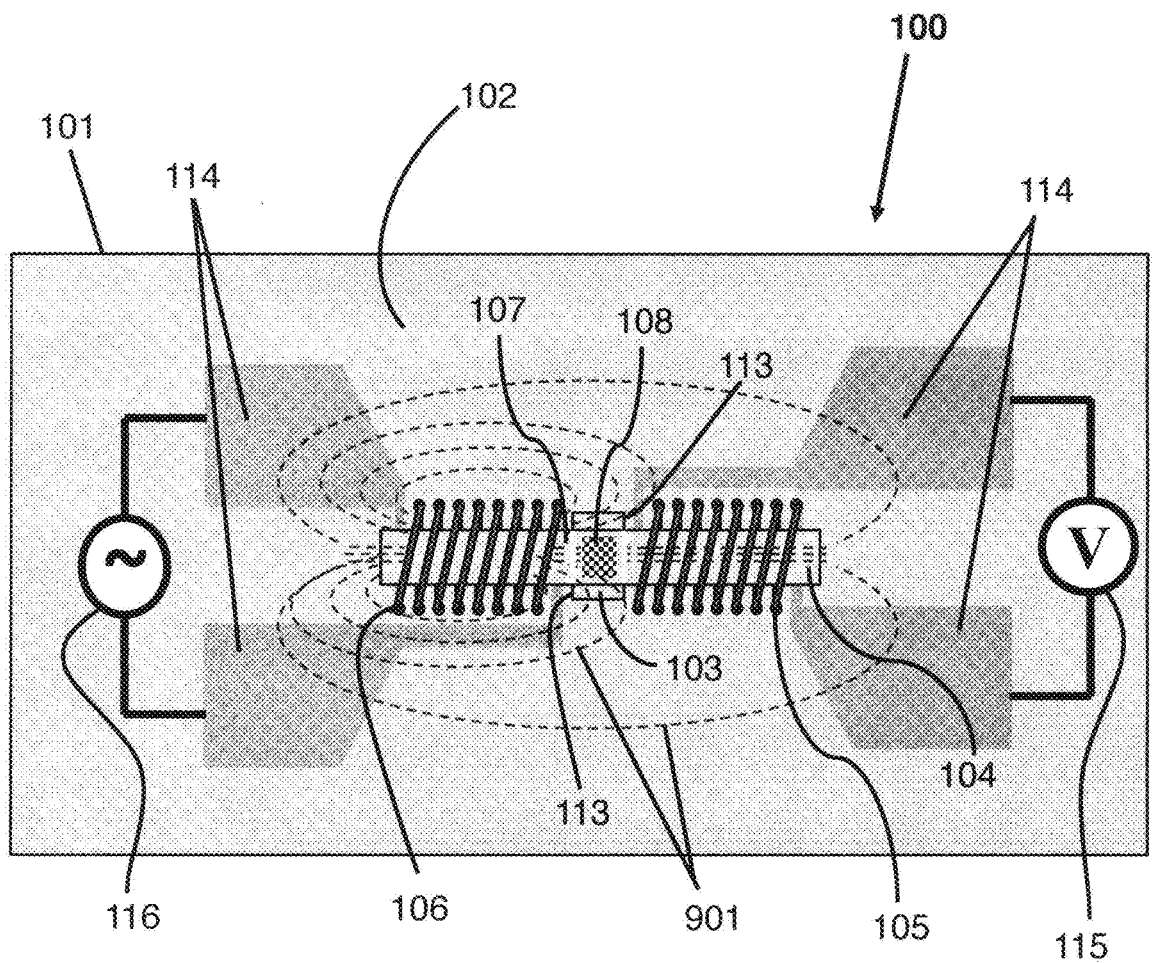
FIG. 9 depicts a top schematic view of a sensor embodiment having a linear flux guide configured as an open magnetic circuit.

FIG. 9 depicts a top schematic view of a sensor embodiment having a linear flux guide configured as an open magnetic circuit. Magnetic flux guide 104 is positioned partially on non-deformable region 102 and partially on mechanically deformable region 103 (represented here as a rectangle with solid black lines). In this exemplary embodiment, the entirety of magnetic flux guide 104 comprises magnetoelastic material. Strainable magnetoelastic subsection 108 of magnetoelastic section 107 is positioned between drive coil 106 and pickup coil 105 and on mechanically deformable region 103.

In this exemplary sensor embodiment, drive coil 106 and pickup coil 105 are each concentrically wound around magnetic flux guide 104. Drive coil 106 can be excited with a time-varying electromagnetic field generated by electrical current source 116, and drive coil 106 can subsequently induce a time-varying electromagnetic field represented by magnetic flux lines 901, shown here as straight and elliptical dashed lines. In this exemplary embodiment, drive coil 106 and pickup coil 105 are coplanar, and the time-varying electromagnetic field induced by drive coil 106 is in-plane with strainable magnetoelastic subsection 108. Part of the induced electromagnetic field is confined in magnetic flux guide 104, which functions to couple that portion of the magnetic field to pickup coil 106.

Figure 10:
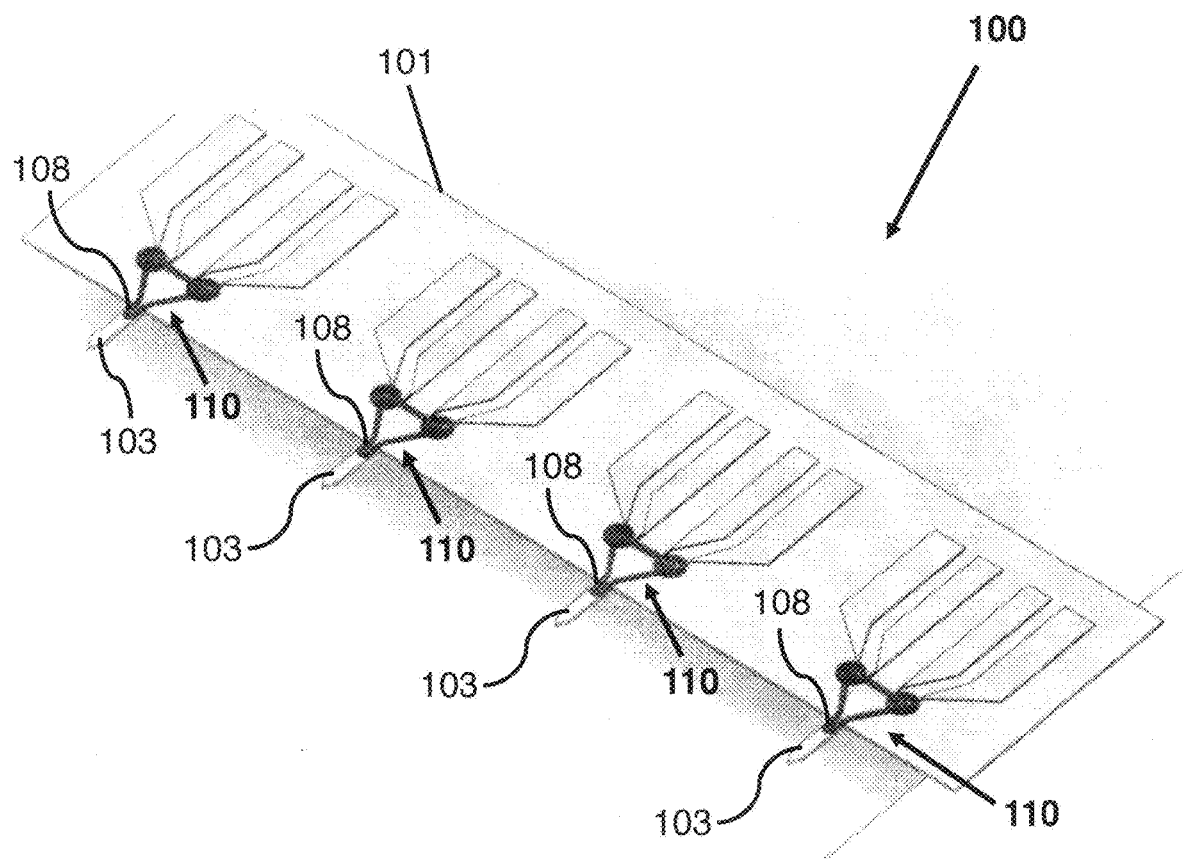
FIG. 10 is a schematic perspective view of a magnetoelastic strain sensor comprising a plurality of transformers operably positioned on a substrate.

FIG. 10 is a schematic perspective view of an exemplary magnetoelastic strain sensor 100 comprising a plurality of transformers 110 operably positioned on substrate 101. In some embodiments, magnetoelastic sensor 100 can comprise a plurality of transformers 110 operably positioned on substrate 101 in that the strainable magnetoelastic subsection 108 of each transformer is configured to be strained by deformation of a mechanically deformable region 103 to which the transformer is operably coupled. In some aspects, one or more than one transformer of a plurality can be operably associated with or integrated with a cantilever.

In some embodiments, sensor 100 can be manufactured using standard semiconductor and MEMS-style fabrication methods, including for example, deposition, patterning, and etching. In many aspects, sensor 100 is manufactured to be micrometer (μm) scale or microscale, thereby enabling sensing for up to low MHz mechanical deformation and achieving high sensitivity. Microscale sensors are frequently referred to as "microsensors" and have one or more than one dimension that is less than about 1 mm. Sensor 100 can comprise elements having microscale and/or nanoscale (nanometer (nm)) dimensions. As used herein nanoscale dimensions include dimensions ranging from about 1 nm to about 1 μm. Some sensor elements may have one or more than one dimension that is microscale, nanoscale, or less than 1 nm but greater than 0.

In various embodiments, sensor substrate 101 may be variously shaped, configured, and dimensioned. In some embodiments, transformer 110 and operably associated components can be integrated with substrate 101. In some aspects, transformer 110 may be integrated with mechanically deformable region 103 (e.g., a microtransformer integrated on a microcantilever), with non-deformable region 102, or with both regions 102 and 103. Some exemplary materials that can be useful as substrate 101 material, including being useful for cantilever material, include silicon, silicon nitride, silicon-on-insulator, germanium, quartz, alumina, diamond, aluminum, platinum, gold, polyimide, mica, and graphite.

In some embodiments, mechanically deformable region 103 may have nanoscale and/or microscale dimensions. In some aspects, a deformable structure such as a cantilever can have a length of about 5 μm to about 500 μm inclusive, a width of about 5 μm to about 100 μm inclusive, and a thickness from about 100 nm to about 5 μm inclusive. Cantilevers useful in some embodiments can have any of a variety shapes, including platform or rectangular shaped cantilevers, circular-shaped cantilevers, ladder-shaped cantilevers, U-shaped cantilevers, triangular-shaped cantilevers, and cantilevers in which substrate 101 surrounds a "cutout region" or void 401. Cantilevers and their dimensions and shapes that are useful for numerous types of applications, e.g. SPM and AFM, are known in the art.

In some embodiments, analyzing strain with a sensor comprises exposing mechanically deformable region 103 to a force, inducing a time-varying electromagnetic field with drive coil 106, receiving with pickup coil 105 at least a portion of the induced time-varying electromagnetic field that passes through strainable magnetoelastic subsection 108, measuring at least one property of an electrical signal representative of the time-varying magnetic field received by pickup coil 105, and comparing the at least one measured property with a reference value. In some aspects, the at least one property of the electrical signal is at least one component of complex amplitude of the electrical signal.

In some embodiments, spread spectrum techniques can be used. Spread spectrum techniques are methods that distribute a signal's power spectral density across multiple frequencies. These methods may reduce interference, improve signal-to-noise ratios, reduce necessary signal power, and suppress inadvertent resonant coupling between the signal and supporting components. For instance, a single strong frequency in the drive signal could inadvertently induce harmonics in the micromechanical system. Maximizing the signal-to-noise that is received by the pickup coil may improve sensor performance. In some embodiments, useful spread spectrum techniques may include chirped pulses, which have a sinusoidal signal with a frequency that increases or decreases over time, and random signals or pseudorandom signals, wherein the signal has a broad power spectral density and a delta-function-like autocorrelation function. In such embodiments, a matched filter can then be used to recover the signal from these methods.

One embodiment for using spread spectrum techniques in analyzing strain with sensor 100, comprises exposing mechanically deformable region 103 to a force, inducing with drive coil 106 an electrical signal comprising a plurality of time-varying electromagnetic fields at different frequencies, receiving with pickup coil 105 an electrical signal comprising the plurality of time-varying electromagnetic fields and comparing the received plurality of time-varying electromagnetic fields with a set of reference values. In some aspects, the plurality of frequencies may be in the form of a chirped pulse, a random signal, or a pseudorandom signal.

What is claimed is:

1. A magnetoelastic sensor comprising:
   a. a substrate comprising a non-deformable region and a mechanically deformable region, the mechanically deformable region coupled to the non-deformable region by a linking structure; and
   b. a transformer comprising;
      i. a magnetic flux guide comprising a magnetoelastic section, the magnetoelastic section comprising a subsection configured to be strainable by deformation of the mechanically deformable region;
      ii. a drive coil disposed and configured for inducing a time-varying electromagnetic field in the flux guide such that at least a portion of the induced time-varying electromagnetic field passes through the strainable magnetoelastic subsection; and,
      iii. a pickup coil disposed and configured for receiving at least a portion of the induced time-varying electromagnetic field that passes through the strainable magnetoelastic subsection; and,
   wherein one or more of the drive coil and the pickup coil has a width greater than the minimal width of the linking structure.

2. The sensor of claim 1 wherein the strainable magnetoelastic subsection comprises magnetoelastic material positioned on the mechanically deformable region of the substrate.

3. The sensor of claim 1 where the strainable magnetoelastic subsection comprises one or more than one of Terfenol-D, galfenol, cobalt, terbium, iron, aluminum, dysprosium, nickel, holmium, thulium, yttrium, erbium, and samarium.

4. The sensor of claim 1 wherein the width of the drive coil and the width of the pickup coil are each greater than the minimal width of the linking structure.

5. The sensor of claim 1 wherein the drive coil, the pickup coil, or both coils have a width greater than about twice the minimal width of the linking structure.

6. The sensor of claim 1 wherein each of the drive coil and the pickup coil has a thickness of from about 20 nm to about 5 µm inclusive.

7. The sensor of claim 1 wherein the drive coil and the pickup coil are positioned on the non-deformable region of the substrate.

8. The sensor of claim 1 wherein the mechanically deformable region and the non-deformable region are adjoined and are coplanar.

9. The sensor of claim 1 wherein a portion of the magnetic flux guide is positioned on the non-deformable region of the substrate.

10. The sensor of claim 1 wherein the transformer is configured as a closed magnetic circuit.

11. The sensor of claim 1 comprising a plurality of transformers, operably positioned on the substrate.

12. A method for analyzing strain using a sensor of claim 1, comprising:
   a. exposing the mechanically deformable region to a force;
   b. inducing with the drive coil an electrical signal comprising a plurality of time-varying electromagnetic fields at different frequencies;
   c. receiving with the pickup coil an electrical signal comprising the plurality of time-varying electromagnetic fields; and
   d. comparing the received plurality of time-varying electromagnetic fields with a set of reference values.

13. The sensor of claim 1 comprising a plurality of pickup coils, at least a first pickup coil being disposed and configured to receive at least a portion of the induced time-varying electromagnetic field that passes through the strainable magnetoelastic subsection.

14. The sensor of claim 13 wherein the sensor is a differencing sensor.

15. A method for analyzing strain using a sensor of claim 14 comprising:
   a. exposing the mechanically deformable region to a force;
   b. inducing a time-varying electromagnetic field with the drive coil;
   c. receiving, with the first pickup coil, at least a portion of the induced time-varying electromagnetic field that passes through the strainable magnetoelastic subsection;
   d. receiving, with a second pickup coil, at least a portion of the induced time-varying electromagnetic field that does not pass through the strainable magnetoelastic subsection;

e. measuring at least one property of an electrical signal representative of the time-varying electromagnetic field received by each of the first and second pickup coils; and f. comparing the at least one property from the first pickup coil with the at least one property from the second pickup coil.

16. The sensor of claim 13 wherein the drive coil and the pickup coils are positioned on the non-deformable region of the substrate.

17. The sensor of claim 16 wherein the flux guide further comprises a compensating section positioned between the drive coil and a pickup coil.

18. The sensor of claim 1 further comprising an electrical current source electrically connected to the drive coil and a signal-receiving device electrically connected to the pickup coil.

19. The sensor of claim 18 wherein the electrical current source is a source of alternating current.

20. The sensor of claim 18 wherein the signal-receiving device further comprises a signal processor.

21. The sensor of claim 1 wherein the magnetic flux guide comprises a plurality of sections.

22. The sensor of claim 21 wherein the magnetic flux guide further comprises a high magnetic susceptibility section distinct from the magnetoelastic section and wherein magnetic material in the high magnetic susceptibility section is different from magnetic material in the magnetoelastic section.

23. The sensor of claim 22 wherein the transformer is configured as a closed magnetic circuit and wherein the magnetoelastic section comprises two separate strainable magnetoelastic subsections.

24. The sensor of claim 1 where in the mechanically deformable region is a region of a cantilever.

25. The sensor of claim 24 wherein the cantilever has a fundamental resonant frequency of from about 1 kHz to about 5 MHz inclusive.

26. The sensor of claim 1 wherein the mechanically deformable region is a region of a microresonator.

27. A method for analyzing strain using a sensor of claim 26, comprising:
a. exposing the mechanically deformable region to a force;
b. inducing with the drive coil an electrical signal comprising a plurality of time-varying electromagnetic fields at different frequencies, and wherein at least one frequency is at least about two times the frequency of a resonant frequency of the microresonator, and wherein at least one additional frequency induces a periodic mechanical excitation of the microresonator, the at least one additional frequency being within about plus or minus 2.5 dB bandwidth of the resonant frequency of the microresonator;
c. receiving with the pickup coil an electrical signal comprising the plurality of time-varying electromagnetic fields; and
d. comparing the received plurality of time-varying electromagnetic fields with a set of reference values.

28. A method for analyzing strain using a sensor of claim 26, comprising:
a. inducing a periodic mechanical excitation of the microresonator;
b. exposing the mechanically deformable region to a force;
c. inducing a time-varying electromagnetic field with the drive coil, wherein the time-varying electromagnetic field has at least one frequency that is at least about two times the frequency of the induced periodic mechanical excitation;
d. receiving with the pickup coil at least a portion of the induced time-varying electromagnetic field that passes through the strainable magnetoelastic subsection;
e. measuring at least one property of an electrical signal representative of the time-varying electromagnetic field received by the pickup coil; and
f. comparing the at least one measured property with a reference value.

29. The method of claim 28 wherein the periodic mechanical excitation is induced by exciting the drive coil with an alternating current and wherein the induced periodic mechanical excitation is within about plus or minus 2.5 dB bandwidth of a resonant frequency of the microresonator.

30. The sensor of claim 1 wherein the magnetoelastic section comprises a plurality of strainable magnetoelastic subsections each subsection configured to be strainable by deformation of the mechanically-deformable region of the substrate, such that at least a portion of the time-varying electromagnetic field passes through each strainable magnetoelastic subsection, and wherein the pickup coil is disposed and configured to receive at least a portion of the time-varying electromagnetic field that passes through each strainable magnetoelastic subsection.

31. The sensor of claim 30, wherein at least two strainable magnetoelastic subsections are separated by a region of the magnetoelastic section that is not strainable.

32. A method for analyzing strain using a sensor of claim 1, comprising:
a. exposing the mechanically deformable region to a force;
b. inducing a time-varying electromagnetic field with the drive coil;
c. receiving with the pickup coil at least a portion of the induced time-varying electromagnetic field that passes through the strainable magnetoelastic subsection;
d. measuring at least one property of an electrical signal representative of the time-varying electromagnetic field received by the pickup coil; and
e. comparing the at least one measured property with a reference value.

33. The method of claim 32 wherein the at least one property of the electrical signal is at least one component of complex amplitude of the electrical signal.

34. The method of claim 32 wherein the induced time-varying electromagnetic field comprises frequencies from about 20 kHz to about 1 GHz inclusive.

* * * * *

UNITED STATES PATENT AND TRADEMARK OFFICE
CERTIFICATE OF CORRECTION

| | |
|---|---|
| PATENT NO. | : 10,648,786 B2 |
| APPLICATION NO. | : 16/116864 |
| DATED | : May 12, 2020 |
| INVENTOR(S) | : Chris W. Mann, Sebastian Liska and Joshua C. Ruedin |

It is certified that error appears in the above-identified patent and that said Letters Patent is hereby corrected as shown below:

In the Specification

Column 10, Line 44, "20 nm to about 5 inclusive" should read --20 nm to about 5 µm inclusive--

Column 12, Line 12, "induced emf to an applied strain a is:" should read --induced emf to an applied strain $\varepsilon$ is:--

Signed and Sealed this
Twenty-third Day of August, 2022

*Katherine Kelly Vidal*

Katherine Kelly Vidal
*Director of the United States Patent and Trademark Office*